June 26, 1962 J. C. WINSLOW ET AL 3,040,480

DRILL POINTER

Filed May 25, 1959 9 Sheets-Sheet 1

INVENTORS
JAMES C. WINSLOW
HAROLD O. HOUSER
BY Forrest J. Lilly
Attorney

DRILL POINTER

INVENTORS
JAMES C. WINSLOW
HAROLD O. HOUSER

BY Forrest J. Lilly
Attorney

June 26, 1962 J. C. WINSLOW ET AL 3,040,480

DRILL POINTER

Filed May 25, 1959 9 Sheets-Sheet 3

INVENTORS
JAMES C. WINSLOW
HAROLD O. HOUSER
BY Forrest J. Lilly
Attorney

INVENTORS
JAMES C. WINSLOW
HAROLD O. HOUSER
BY Forrest J. Lilly
Attorney

DRILL POINTER
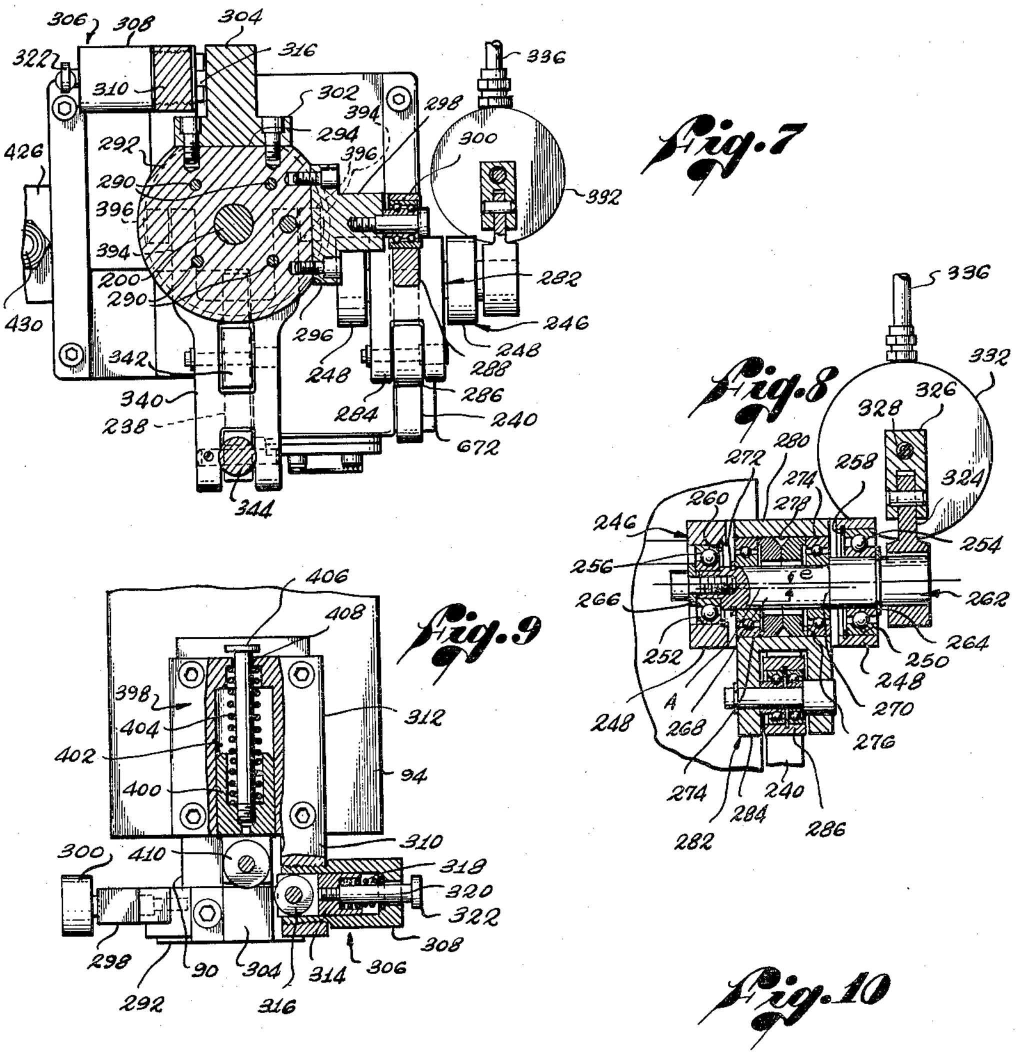
Fig. 7, Fig. 8, Fig. 9, Fig. 10
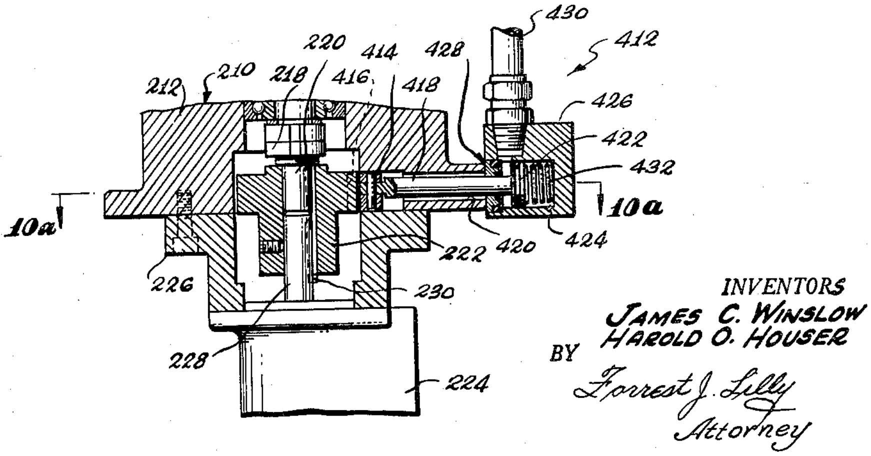
INVENTORS
JAMES C. WINSLOW
HAROLD O. HOUSER
BY Forrest J. Lilly
Attorney

DRILL POINTER

INVENTORS
JAMES C. WINSLOW
HAROLD O. HOUSER
BY Forrest J. Lilly
Attorney

INVENTORS
JAMES C. WINSLOW
HAROLD O. HOUSER
BY Forrest J. Lilly
Attorney

INVENTORS
JAMES C. WINSLOW
HAROLD O. HOUSER
BY Forrest J. Lilly
Attorney

INVENTORS
JAMES C. WINSLOW
HAROLD O. HOUSER
BY Forrest J. Lilly
Attorney

United States Patent Office 3,040,480
Patented June 26, 1962

3,040,480
DRILL POINTER

James C. Winslow, Sierra Madre, and Harold O. Houser, El Monte, Calif., assignors to Winslow Product Engineering Corporation, Los Angeles, Calif., a corporation of California Filed May 25, 1959, Ser. No. 815,509
31 Claims. (Cl. 51—94)

This invention relates generally to machines for sharpening twist drills, and more particularly to an automatic drill pointing machine.

It is well known in the art that "pointing" a drill constitutes grinding a conical tip on the drill. This is accomplished by bringing the tip end of each rib of the drill into contact with a grinding surface which is so inclined to the drill axis as to provide the drill tip with a predetermined point angle. The optimum point angle varies for different materials, the usual point angle being on the order of 118 degrees.

A refinement in drill pointing involves grinding an arcuate clearance or relief in each lip in such a way as to produce a sharper, more pronounced centering point on the drill. This point greatly improves the precision and accuracy of the drill.

These reliefs are commonly ground in the drill tip by using a grinding wheel having a peripheral grinding surface which terminates in a circular grinding edge. The drill and grinding wheel are relatively advanced into contact in such a way that the relative movement of the drill with respect to the grinding wheel is a compound movement involving relative axial motion of the drill toward and into contact with the peripheral grinding surface and relative lateral translational motion of the drill toward and across the circular grinding edge. The drill is simultaneously rotated in timed relation to the relative movement of the drill and grinding wheel.

During initial relative movement of the rotating drill tip past the grinding wheel, the peripheral grinding surface grinds a conical end face or lip on the drill. Subsequent relative movement of the drill tip occurs across the circular grinding edge in such a way that a relief is ground in the end face. This procedure is repeated for each rib of the drill, the walls of the several ground reliefs merging tangentially of the drill axis to form a relatively sharp centering point.

In order to obtain accurate coaxiality of the centering point with respect to the drill axis, it is necessary that the drill be rotated exactly on its own axis during its relative movement past the grinding wheel. If the drill is supported in a rotary chuck, for example, the drill turns on the chuck axis, which may be eccentric to the drill axis, with the result that the drill point will not be accurately coaxial with the drill axis.

A broad object of the present invention is to provide an improved drill pointing machine of the character described.

A more specific object of the invention is to provide a drill pointing machine which is automatic in operation.

Another object of the invention is to provide a drill pointing machine in which the drill being pointed is rotated exactly on its own axis during its relative movement past the grinding wheel, so that exact coaxiality of the drill point with respect to the drill axis is obtained.

Briefly, the objects of the invention are attained by providing a drill pointing machine equipped with a frame mounting a drill holder and a rotary grinding wheel of the character preliminarily described. The machine is also equipped with an automatic, power driven means for effecting relative cyclic movement of the drill holder and grinding wheel toward and away from one another and simultaneous timed rotation of the drill in the holder in such manner that the drill tip is automatically pointed and relieved in the way preliminarily discussed during its several passes past the grinding wheel.

One of the most important features of the invention involves the provision of a fixed bushing in the drill holder for rotatably supporting and guiding the drill being pointed immediately adjacent to its tip. By rotatably supporting the drill in a bushing in this way, the drill is accurately rotated on its own axis while its tip is being ground, with the result that extremely accurate coaxiality of the drill point with the drill axis is obtained.

Other important aspects of the invention involve various novel features in the construction and design of the present drill pointing machine which render the latter capable of rapid and yet accurate automatic drill pointing operation. The machine also embodies a novel dressing attachment for maintaining the grinding wheel accurate and true.

The invention will be best understood from the following detailed description thereof taken in connection with the annexed drawings, wherein.

Figure 3:
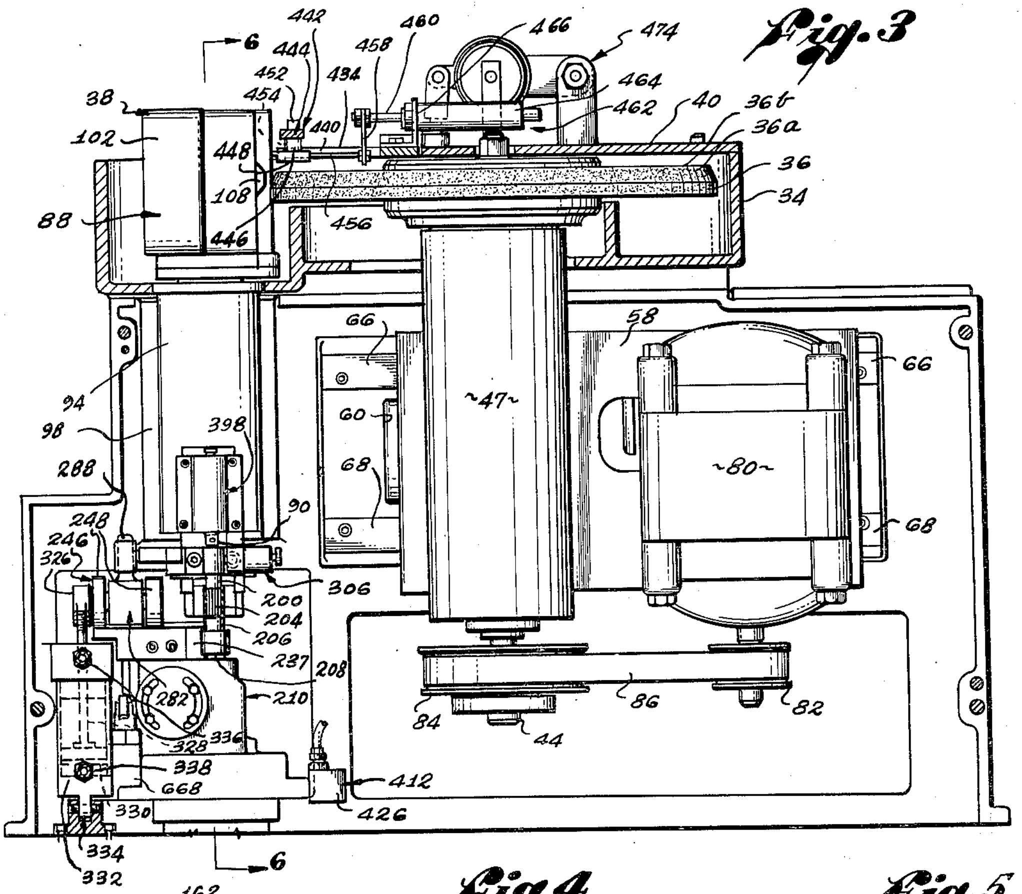
FIG. 3 is an elevational view of the machine as the latter is viewed from the rear in FIG. 1, with the base of the machine omitted for simplicity and the rear half of the machine housing removed to expose the working parts therein.
Figures 4, 4A, 4B, 5:
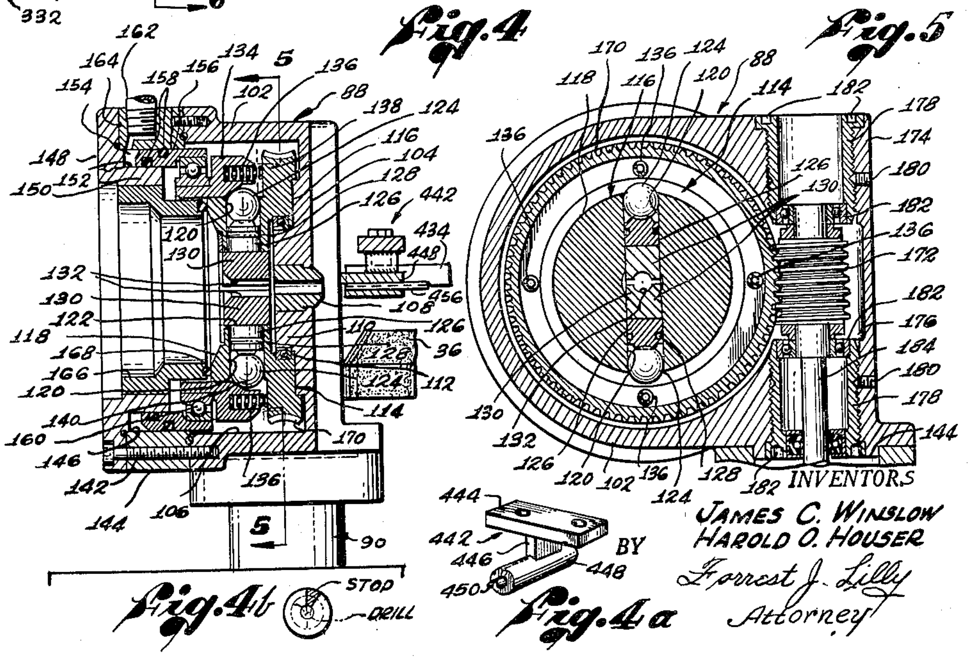
FIG. 4 is an enlarged section of the drill holder of the machine.
Figure 6:
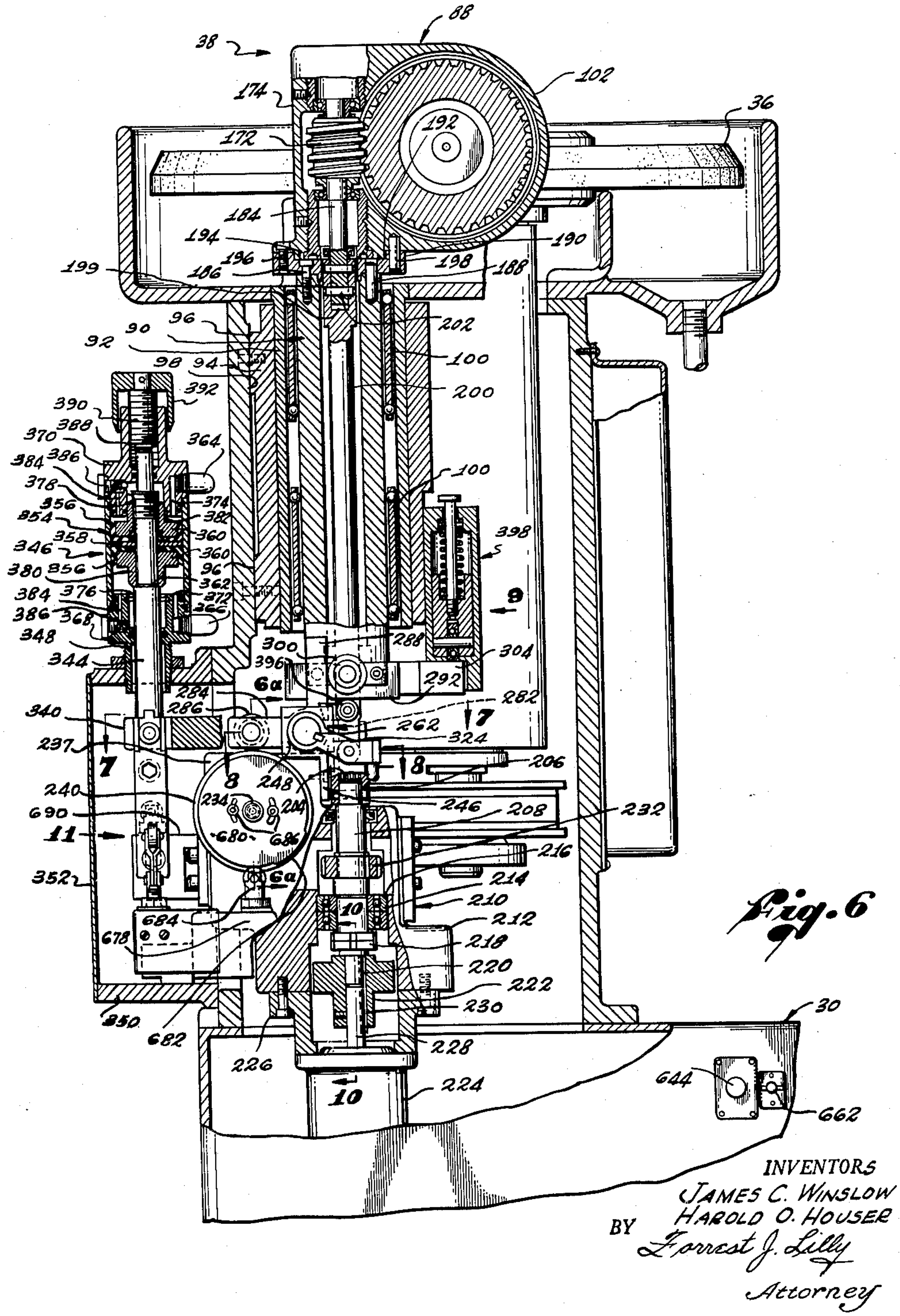
Figures 6A, 6B, 6C, 6D, 10A:
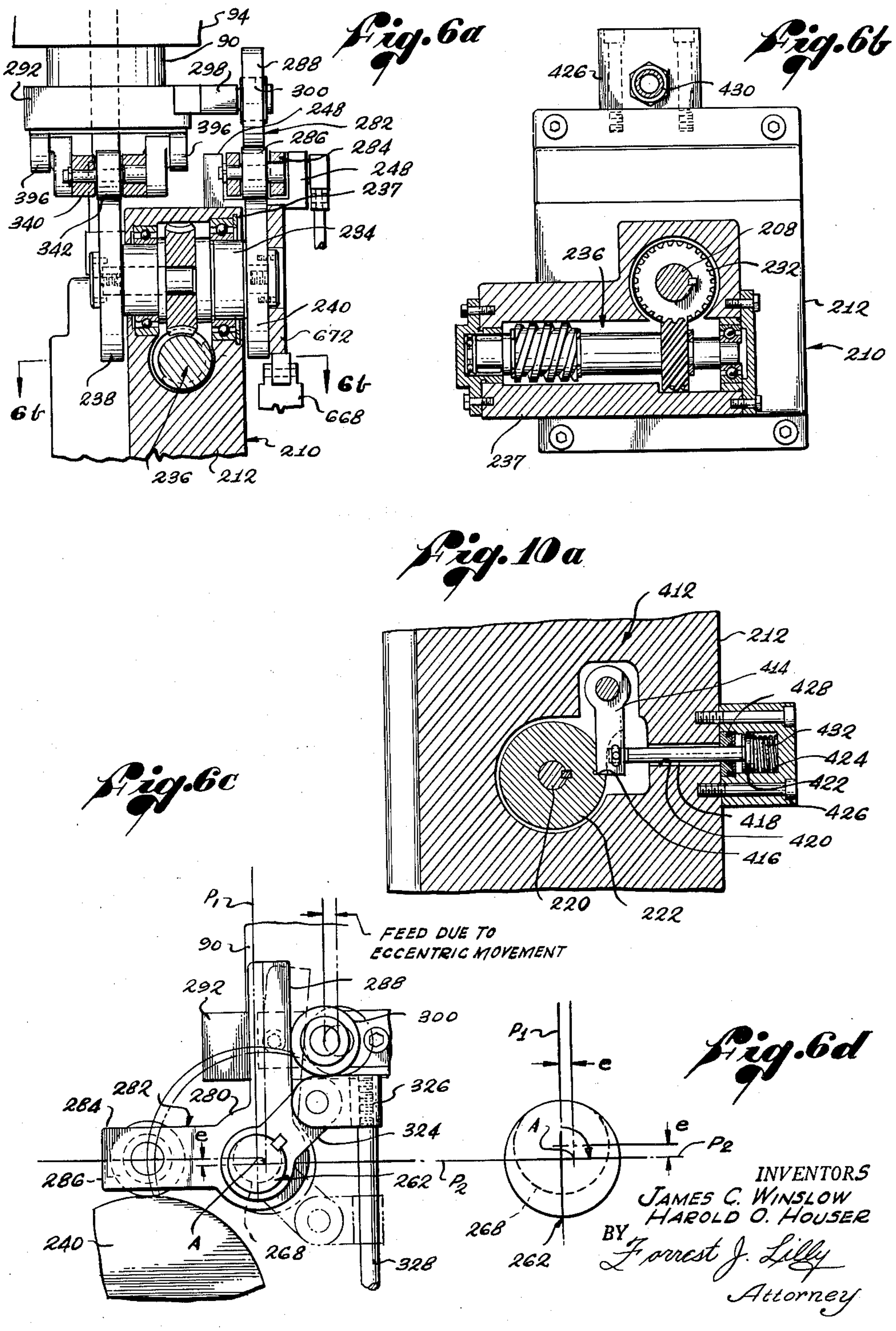
Figures 12, 13, 14, 14A, 14B, 14C, 14D, 15:
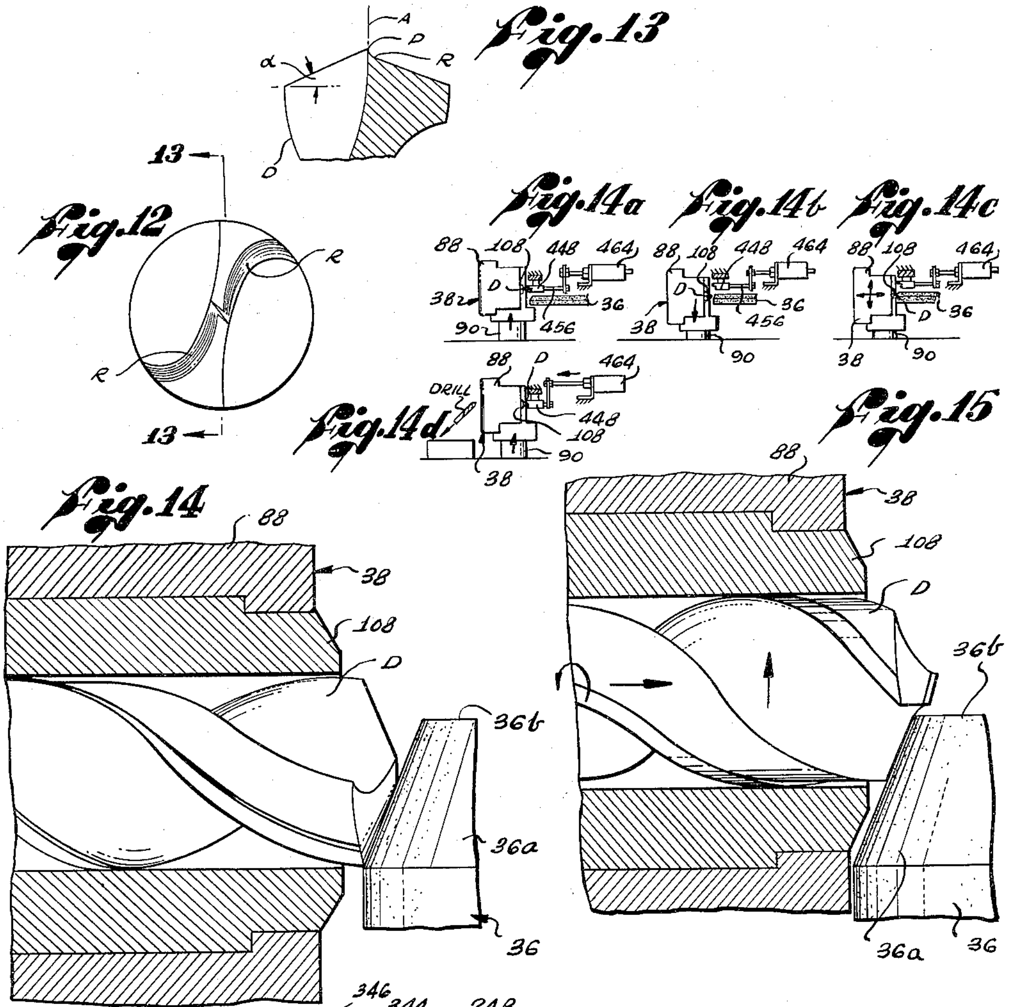
Figure 11:
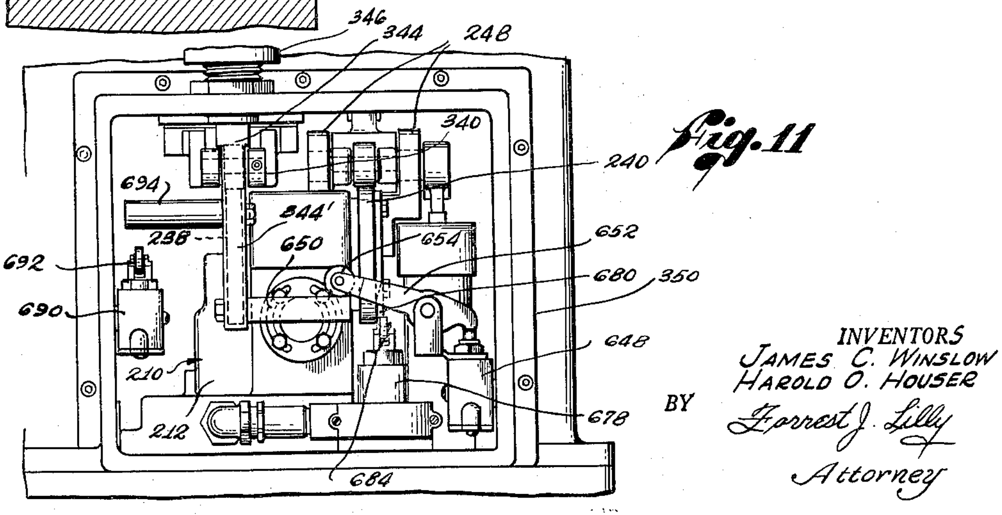
Figures 16, 17:
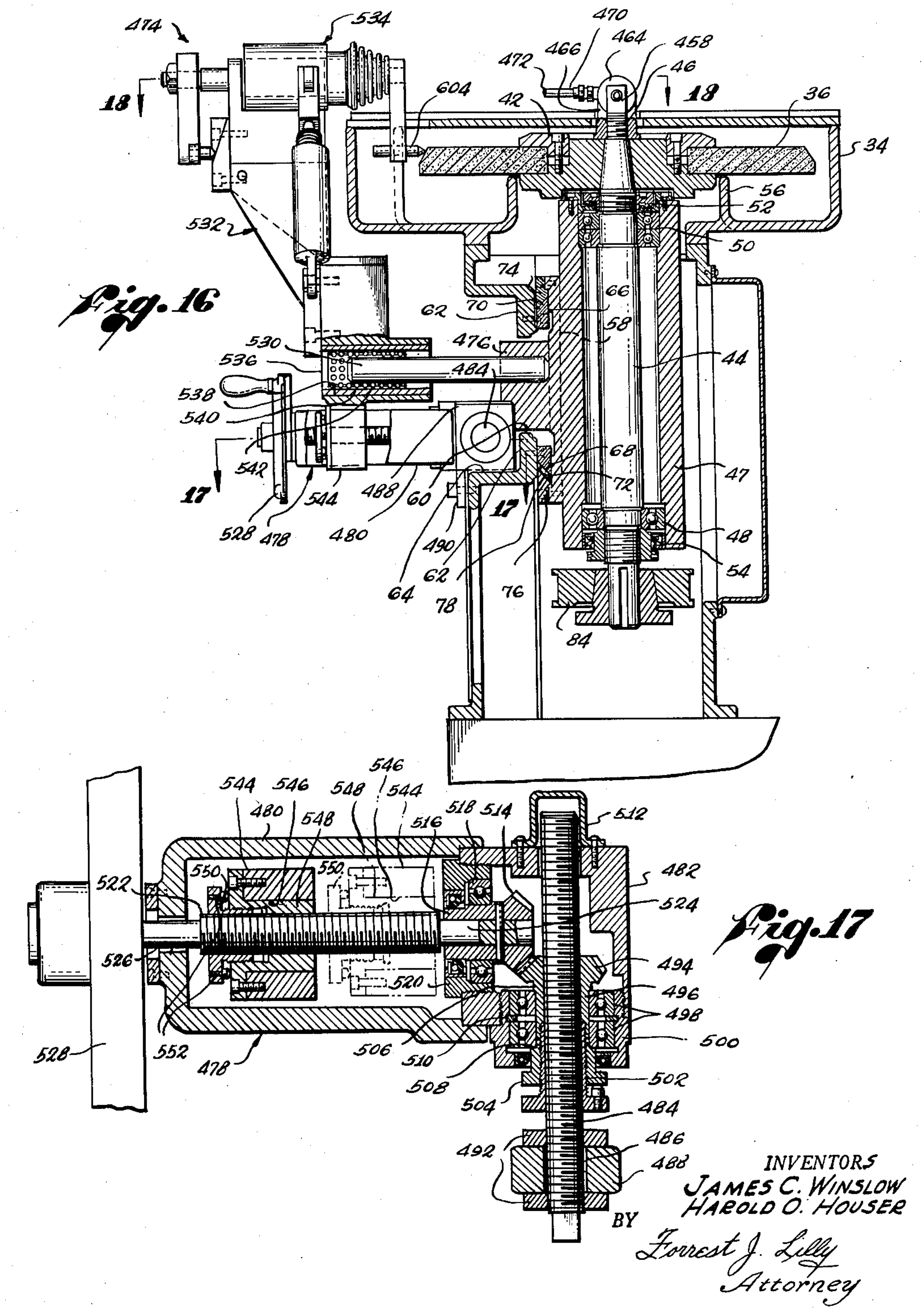
Figure 18:
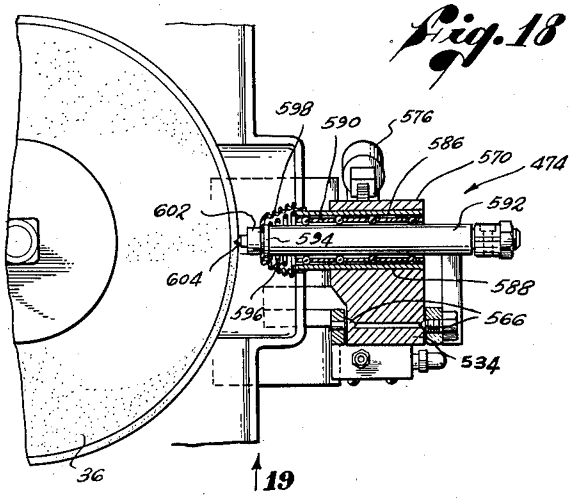
Figure 19:
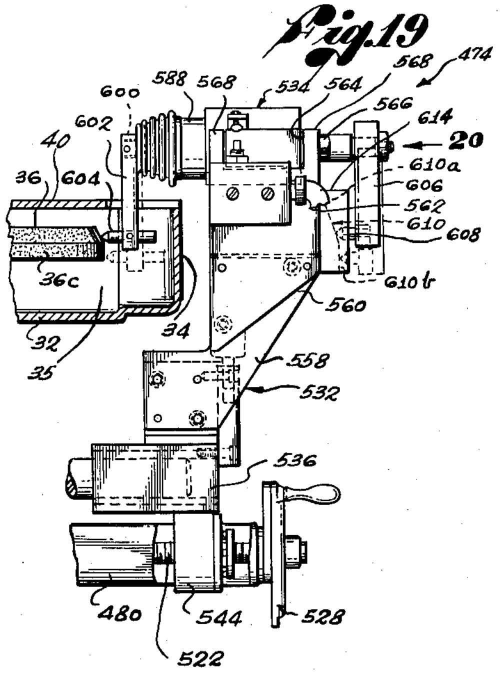
Figure 20:
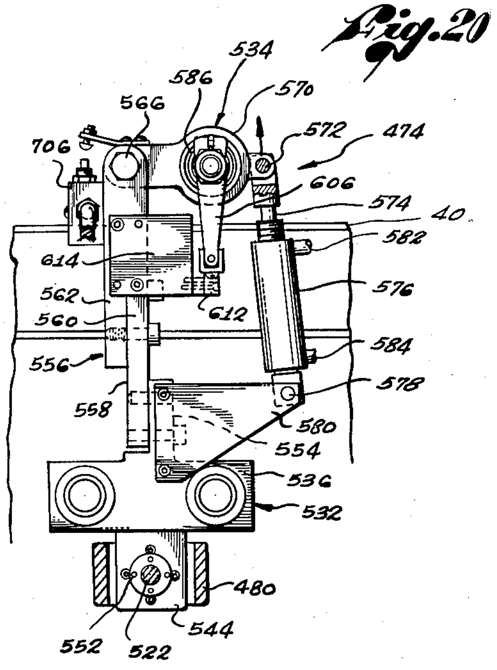

FIG. 4*a* is a perspective view of the drill alignment device embodied in the machine;

FIG. 4*b* is an enlarged end view of the aligning sleeve in the device of FIG. 4*a*;

FIG. 5 is a section taken along line 5—5 of FIG. 4;

FIG. 6 is an enlarged section taken along line 6—6 of FIG. 3;

FIG. 6*a* is a section taken along line **6*a*—6*a*** of FIG. 6;

FIG. 6*b* is a section taken along line **6*b*—6*b*** of FIG. 6*a*;

FIG. 6*c* is an enlarged detail of a feed means in the machine;

FIG. 6*d* is a schematic illustration of the action which occurs in the feed means of FIG. 6*c*;

FIG. 7 is a section taken along line 7—7 of FIG. 6;

FIG. 8 is a section taken along line 8—8 of FIG. 6;

FIG. 9 is a view looking in the direction of arrow 9 of FIG. 6, with parts of the machine broken away for clarity;

FIG. 10 is an enlarged section taken along line 10—10 of FIG. 6;

FIG. 10*a* is a section taken along line **10*a*—10*a*** of FIG. 10;

FIG. 11 is a view looking in the direction of arrow 11 of FIG. 6;

FIG. 12 is an enlarged end view of a drill tip which has been pointed in the present machine;

FIG. 13 is a section taken along line 13—13 of FIG. 12;

FIG. 14 is a view showing an initial grinding position of a drill which is being pointed in the machine and illustrating how a conical lip face is initially ground on the drill tip;

FIGS. 14*a*–14*d* are a sequence of views illustrating the operation of the machine;

FIG. 15 is a view similar to FIG. 14, showing a subsequent grinding position of the drill and illustrating the manner in which a relief is ground in the drill tip;

FIG. 16 is a side elevational view, partially in section, of the attachment for dressing the grinding wheel of the machine;

FIG. 17 is an enlarged section taken along line 17—17 of FIG. 16;

FIG. 18 is a section taken along line 18—18 of FIG. 16;

FIG. 19 is a view looking in the direction of arrow 19 of FIG. 18 and illustrating the mode of operation of the wheel dressing attachment;

FIG. 20 is a view looking in the direction of the arrow 20 in FIG. 19; and

Figure 21:
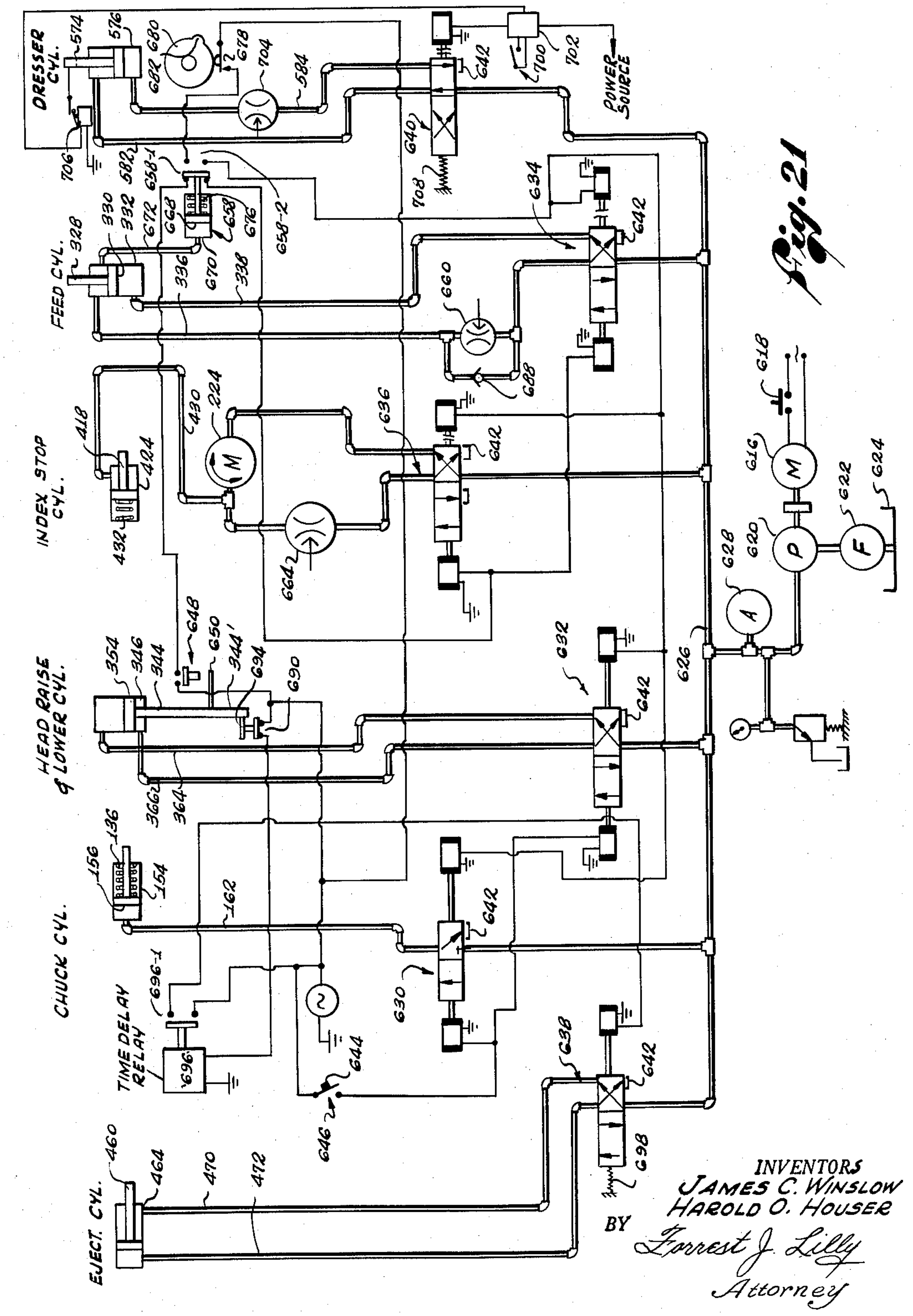

FIG. 21 is a schematic diagram of an electrical and hydraulic control system embodied in the machine.

Figure 1:
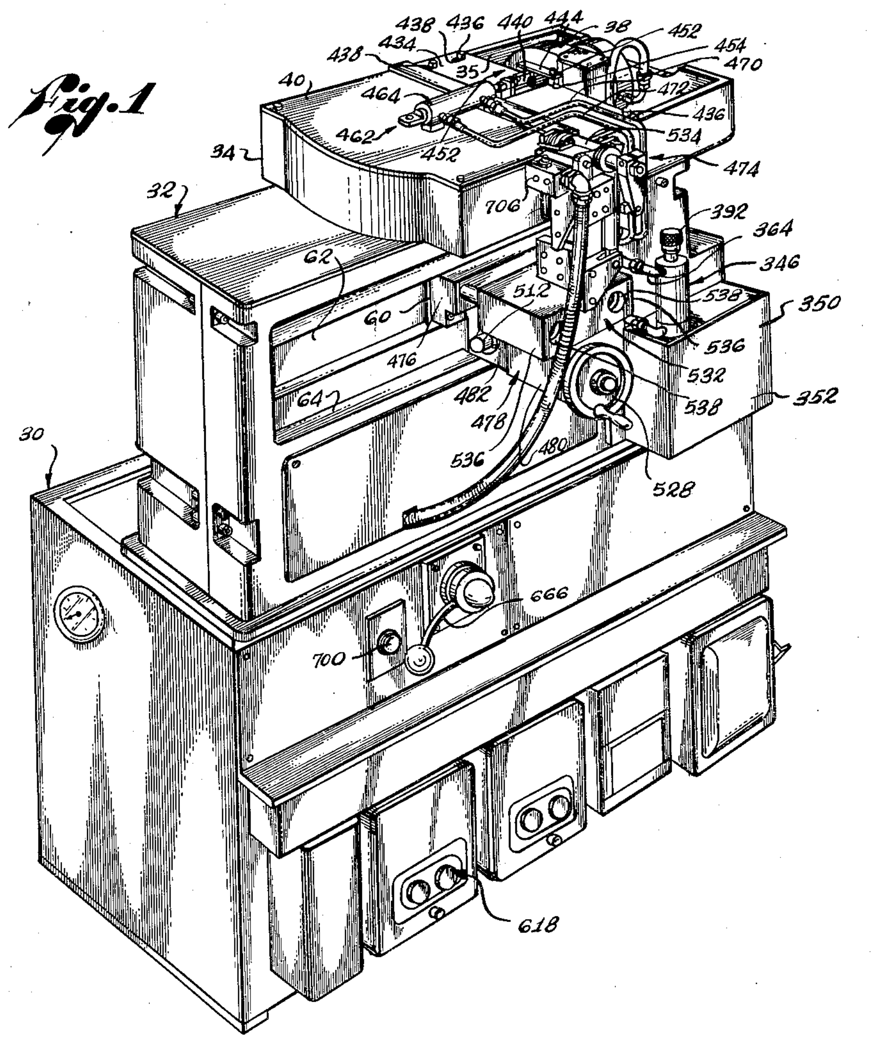
FIG. 1 is a perspective view of the present drill pointing machine.
Figure 2:
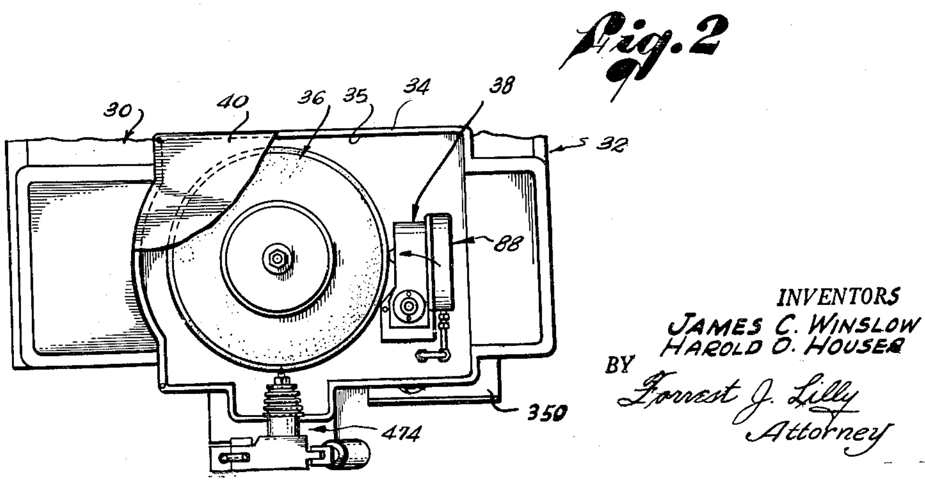
FIG. 2 is a top plan view of the machine with a part of its cover broken away to reveal the grinding wheel and drill holder.

Referring first to FIGS. 1 and 2 of these drawings, the present drill pointing machine will be seen to comprise an enclosed base 30 which is supported on the floor. Mounted on the upper side of this base is a housing 32 which encloses most of the working parts of the present machine. This housing includes an upper vertical flange 34. Flange 34 defines an open topped well 35 of generally rectangular configuration in which the rotary grinding wheel 36 and drill holder 38 of the machine are located. A removable cover plate 40 is bolted to the left end of this flange so as to cover the grinding wheel 36. The drill holder 38 is exposed at the right-hand end of the well, as shown.

Referring now to FIGS. 3 and 16, it will be seen that the grinding wheel 36 is carried on a central hub 42. This hub is tightly fitted on the upper tapered end of a vertical shaft 44. A nut 46 locks the hub to the shaft. Shaft 44 is mounted for rotation and against axial movement in a cylindrical grinding wheel support 47 by means of ball bearing units 48 and 50, fixed in the opposite, recessed ends of the grinding wheel support. Dirt seals 52 and 54 are placed in the open ends of the grinding wheel support, as shown, to prevent contamination of the bearing units 48 and 50 by abrasive dust and other foreign matter. Also, for this latter purpose, an upstanding cylindric flange 56 is formed on the housing, which flange encircles the upper shaft bearing 50 and terminates close to the underface of the grinding wheel 36.

Integrally formed with one side of the grinding wheel support 47 is a plate 58. This plate extends a distance to the right of the grinding wheel support, as the machine is viewed in FIG. 3, and is located directly behind a narrow horizontal opening 60 in the front of the machine, as the latter is viewed in FIG. 1. The frame wall 62, having the opening 60, is inset a distance into the front of the machine housing 32 so that a rectangular recess 64 is formed in the front side of the machine.

Mounted on the rear side of the inset wall 62, along the upper and lower edges of the opening 60, are a pair of rails 66 and 68. The upper rail 66 has an upper inclined face 70 and the lower rail 68 has a lower inclined face 72. Plate 58, fixed to the cylindrical grinding wheel support 47, mounts a pair of upper and lower rails 74 and 76 which straddle the rails 66 and 68. The upper grinding wheel support rail 74 has a lower inclined face which slidably engages the upper inclined face 70 of the frame rail 66. The lower grinding wheel support rail 76 has an upper inclined face between which and the lower inclined face 72 on the frame rail 68 is located a gib 78.

The rails 66, 68, 74 and 76 serve to slidably mount the grinding wheel support 47 and its plate 58 for movement toward and away from the drill holder 38. Thus, the cylindrical grinding wheel support 47 and its integral plate 58 form a movable carriage which supports the grinding wheel 36 on the frame of the machine for adjustment toward and away from the drill holder 38.

Mounted on the right-hand end of plate 58, as the machine is viewed in FIG. 3, is a motor 80. Fixed to the shaft of this motor and a lower end of the grinding wheel support shaft 44, respectively, are pulleys 82 and 84 around which are trained a drive belt 86. Grinding wheel 36 is thus driven from the motor 80.

From the description of the present machine thus far, it will be seen that the grinding wheel 36 and its drive motor 80 are supported on the carriage 47, 58, for adjustment as a unit toward and away from the drill holder 38. This adjustment of the grinding wheel occurs during operation of the dressing attachment to be described later, and for this reason the means for effecting adjustment of the grinding wheel relative to the drill holder 38 will be discussed in the subsequent description of the attachment.

The drill holder 38 and its associated mechanism will now be described by reference to FIGS. 1 through 14. Holder 38 comprises an upper head structure 88 and a lower vertical tubular supporting post 90 (FIG. 6). Post 90 extends concentrically through a bearing sleeve 92 which is frictionally fitted in an outer supporting sleeve 94. This supporting sleeve has flats 96 on one side seating against a flat inner surface 98 on the housing 32 and is bolted to the housing, as shown. The outside diameter of post 90 is somewhat less than the inside diameter of the bearing sleeve 92, so that an annular space exists between the parts. Located in this annular space are a pair of annular post bearings 100 which support the post 90 for rotation and vertical axial movement in the housing 94.

The head structure 88 is at the upper end of the post 90 comprises a generally cylindric housing part 102 (FIGS. 4 and 5). The axis of this housing part is horizontal and laterally offset from the vertical axis of the post. Oscillation of the drill holder 38 on the axis of the post 90 therefor effects movement of the housing part 102 toward and away from the grinding wheel 36.

Housing part 102 has a forward end wall 104 and a circular interior space 106 which opens through the rear end of the part. Fixed against both rotation and axial movement in the forward end wall 104 is a drill bushing 108. This drill bushing is concentric with the housing part 102 and is designed to rotatably support the tip of the drill being pointed, as will be hereinafter more fully described. For this reason, the bushing is preferably removable from the housing part to permit its replacement by bushings of different internal diameters for receiving drills of different diameters.

Formed on the rear side of the forward end wall 104 is a circular axial projection or hub 110. Rotatably mounted on this projection, by means of a ball bearing unit 112, is a rotary chuck 114 for gripping and rotating the drill being pointed. The ball bearing unit 112 serves also as an axial thrust bearing which restrains the chuck 114 against axial movement in the housing part 102, for reasons to be seen.

Chuck 114 comprises a generally cylindrical body 116 having a rear reduced diameter portion 118. This rear portion of the chuck body is formed with a pair of coaxial, diametrically opposed bores 120. Bores 120 open at their outer ends through the outer cylindrical surface of the rear portion 118 of the chuck body. At their inner ends, the bores 120 open to a rectangular opening 122 which extends axially through the chuck body 116.

Slidably fitted in each bore 120 is an outer ball 124 and an inner plunger 126. Each plunger 126 carries a seal ring 128 and has, at its outer end, a reduced axial projection formed with a spherical seat for receiving the adjacent ball 124, as shown.

Slidably fitted in the central rectangular opening 122 in the chuck body 116 are a pair of rectangular chuck jaws 130. These chuck jaws are formed with opposing semi-spherical grooves 132 which are flared at the rear end, as shown. The grooves 132 define an opening for receiving the drill to be pointed.

Slidably fitted on the rear reduced portion 118 of the chuck body 116 is a chuck operating sleeve 134. This chuck sleeve is urged rearwardly, that is, to the left, as viewed in FIG. 4, by a series of coil springs 136 which are contained in bores in the forward end of the chuck sleeve and engage the rear face of the forward enlarged diameter portion 138 of the chuck body 116.

Balls 124 project beyond the outer cylindrical surface of the rear portion 118 of the chuck body for engagement with a forwardly facing, internal conical surface 140 on the chuck sleeve 134. It will be apparent from FIG. 4 that when the chuck sleeve 134 is moved forwardly on the chuck body 116, balls 124 are cammed inwardly in their bores 120. Radial inward forces are thereby exerted on the chuck jaws 122, tending to move the latter together, through the intermediate plungers 126. A drill positioned in the drill bushing 108 and the recesses 132 of the chuck jaws is thereby gripped by the latter for rotation with chuck 114, as will presently be described.

Secured to the rear end of the cylindrical housing part 102, by bolts 142, is a ring or cylinder 144. The diameter of the internal cylindrical surface 146 of this cylinder is slightly less than the internal diameter of the circular space 106 in the housing part 102. Secured to the rear side of the cylinder 144, by means of the bolts 142, is a flanged collar 148. This collar has a forward sleeve portion 150 which extends concentrically through the cylinder 144. The outer cylindrical surface 152 of the sleeve portion 150 is spaced inwardly from the inner cylindrical surface 146 of the cylinder 144, so that an annular space 154 is formed therebetween.

Slidably fitted in the annular space 154 is an annular piston 156. This piston carries O-rings 158 that slidably seal the piston to the inner cylinder wall 146 and the outer sleeve wall 152.

Positioned between the rear, reduced diameter end of the chuck sleeve 134 and the forward end of the piston 156 is a ball bearing unit 160. The inner race of this bearing is tightly fitted on the rear end of the chuck sleeve 134, and the outer ring of the bearing is tightly fitted within the forward end of the piston 156. The chuck sleeve 134 is thereby connected to the piston 156 for movement by the latter, the bearing 160 permitting the chuck sleeve to rotate freely with respect to the piston. Springs 136 serve to urge the chuck sleeve 134 and piston 156 rearwardly.

As will presently be more fully described, the piston 156 is operated by hydraulic fluid. This hydraulic fluid is conveyed to the annular space 154 to the rear of the piston through a hose 162 attached to the cylinder 144 and a passage 164 in the cylinder. Seal rings are placed between the cylinder 144, the housing part 102 and the flanged collar 148, as shown, to seal against fluid leakage.

Frictionally fitted in the central opening of the flanged collar 148 is a stepped sleeve 166. The forward end of this sleeve is reduced in diameter to fit loosely within the rear end of chuck sleeve 134, and carries a dirt and oil seal 168 which engages the rear face of the chuck body 116.

Briefly, in operation of the drill holder thus far described, a drill to be pointed is inserted through the openings 132 in the chuck jaws 130 and through the drill bushing 108. Hydraulic fluid is then admitted to the cylinder space 154 at the rear side of the piston 156 to urge the latter forwardly against the action of the chuck sleeve biasing springs 136. The chuck sleeve is thereby moved forwardly on the chuck body 116, to cam the balls 124 inwardly, and thereby urge the chuck jaws 130 together for clamping the drill therebetween. As mentioned previously, the bearing 112 which rotatably supports the chuck body on the housing part 102 also serves as a thrust bearing which takes up the thrust exerted on the chuck body by the forward movement of piston 156 to clamp the chuck jaws 130.

After the chuck jaws have been clamped in this way, the entire chuck structure 114 is rotated, to rotate the drill bit clamped thereby, as follows. The forward enlarged portion 138 of the chuck body 116 is peripherally formed with worm teeth 170. These worm teeth mesh with a worm gear 172 which rotates on the axis of the post 90 of the drill holder, as will now be described.

As may be observed most clearly in FIGS. 5 and 6, the housing part 102 includes a generally rectangularly configured enlargement 174 at one side which is axially aligned with the post 90 of the drill holder. Extending through this enlargement, coaxially with the post, is a bore 176 which opens through the upper and lower sides of the enlargement. Opposite ends of this bore are threaded and have sleeves 178 screwed therein. Sleeves 178 are locked against turning by setscrews 180 and have wrench receiving sockets 182 at their outer ends.

Sleeves 178 are internally recessed at their inner ends for receiving, with a friction fit, the outer races of a pair of ball bearing units 182. Opposite ends of worm 172 are supported by the inner races of these ball bearings, so that the worm is rotatably mounted on housing part 102 for rotation on the axis of the post 90, as mentioned previously. Rotation of the worm, of course, rotates the chuck 114 and a drill gripped by its chuck jaws 130. The worm is driven in rotation through a shaft 184 on which it is tightly mounted, as will be presently described.

The head structure 88 of the drill holder 38 is mounted on the upper end of the post 90, as follows. Fixed to the upper end of the post 90, by bolts 186 (FIG. 6) and pins 188, is a centrally apertured collar 190. This collar has a circular recess 192 in its upper face for receiving a circular lug 194 on the underside of the enlargement 174 of the head structure 88. The head structure is secured to the collar 190 by bolts 196 and pins 198.

As may be seen most clearly in FIG. 6, the lower end of the worm shaft 184 extends below the underside of the head structure 88 and into a socket 199 in the upper end of a vertical drive shaft 200 which extends downwardly through the central opening in the post 90. These shafts are drivably coupled by pins 202.

In FIGS. 3 and 6, it will be observed that the drive shaft 200 extends a distance below the post 90, and has a splined lower end 204. This splined end of the shaft slidably engages in a splined coupling sleeve 206. Referring most particularly to FIG. 6, the splined coupling sleeve 206 will be seen to be pinned to the upper end of a vertical shaft 208 which forms part of a gear drive unit 210. This unit includes a housing 212 which is bolted to the main frame housing 32. Shaft 208 is rotatably mounted in the gear drive housing 212 by ball bearing units 214. An internal shoulder 216 on the gear housing 212 positions the bearings 214 in the housing while collars 218 threaded on the shaft 208 position the latter in the bearings.

Shaft 208 has a lower, reduced diameter extension 220 which extends into an axial bore in an indexing collar 222. The lower end of the vertical opening in the gear housing 212, through which the shaft 208 extends, is enlarged and opens through the underface of the housing for receiving the indexing collar 222.

Indicated at 224 is a hydraulic motor having a flange 226 which is bolted to the underface of the gear housing 212. This motor extends downwardly through an opening in the upper panel of the base 30 of the machine, into the interior of the base. The shaft 228 of motor 224 also extends into the axial bore through the indexing collar 222. This motor shaft and the shaft extension 220 are keyed to the indexing collar by a key 230. As will be presently described, the indexing collar 222 forms part of an indexing mechanism for initially locating the shaft 208 in a predetermined angular position.

From this description, it will be apparent that the worm 172 within the head structure 88 of the drill holder 38 is connected by shafts 184 and 200, the splined coupling 204, 206 and shaft 208 to the hydraulic motor shaft 228, so that the worm, and therefore the drill chuck 114 within the head structure 88 are driven in rotation from the motor 224. During operation of the drill pointing machine, the chuck 114 in the drill holder 38 is continuously rotated and the drill holder is simultaneously raised and lowered, and oscillated on the axis of its post 90, in timed relationship to the rotation of its chuck. The splined coupling 204, 206 between the drive shaft 200 carried on drill holder 38 and the shaft 208 of the gear unit 210 obviously permits raising and lowering of the drive shaft 200 with the drill holder during operation of the machine.

The means for raising and lowering and simultaneously oscillating the drill holder will now be described with particular reference to FIGS. 3 and 6 through 11. Fixed to shaft 208 of the gear drive 210, just above its bearings 214, is a helical gear 232. This gear drives a horizontal output shaft 234 of the gear box 210 through intermediate gearing 236 (FIGS. 6*a*, 6*b*) of the box. Shaft 234 is rotatably mounted in and projects beyond opposite sides of an upwardly projecting part 237 of the housing for gear box 210. Mounted on opposite ends of shaft 234 are a pair of disc cams 238 and 240.

Bolted to the forward side of the upstanding part 237 on the housing of gear box 210, as the machine is viewed in FIG. 3 (which is the right-hand side of the upstanding part 237 as the machine is viewed in FIG. 6) is a support plate 246. This support plate includes a pair of horizontal spaced, vertical arms 248. These arms have enlarged bores 250 and 252 (FIG. 8) in which are located ball bearing units 254 and 256. These ball bearings are positioned in one axial direction in their respective bores by snap rings 258 and 260.

Supported adjacent its opposite ends in the inner races of these ball bearings is a shaft 262. A snap ring 264 adjacent one end of the shaft and a bolt and washer means 266 threaded in the other end of the shaft serve to axially position the latter in the bearings, as well as to retain the bearings in their respective support arms 248.

Shaft 262 is machined to provide it with the stepped configuration illustrated, and so that the intermediate step or shaft portion 268 will be slightly eccentric to the coaxial shaft ends which are supported in the bearings 254, 256. The amount of this eccentricity is denoted by the letter *e* in FIGS. 6*c*, 6*d* and 8.

Mounted on this eccentric shaft portion 268, between a shoulder 270 on the shaft and a snap ring 272, fixed on the shaft, are a pair of ball bearing units 274. These bearings are spaced by bearing spacers 276.

The outer races of the ball bearings 274 are press-fitted in a bore 278 which extends axially through the hub 280 of a bell crank lever 282. Lever 282 is thus rockably supported between the arms 248 of support plate 246 for pivoting on the axis of the eccentric shaft portion 268.

One arm 284 of the bell crank lever 282 overlies cam 240. This arm has a slot in which is rotatably mounted a cam follower roller 286 that rides on the edge of the cam 240. This cam is configured, in the manner hereinafter described, to cause rocking of bell crank lever 282 as the cam rotates. The resultant right and left-hand swinging movement of the bell crank arm 288 causes oscillation of the drill holder 38 on the axis of its post 90, as will now be described.

Fixed to the lower end of the post 90, by means of four bolts 290 (FIG. 7) is a disc 292. This disc has flats 294 and 296 ground on its upper and right-hand sides, as viewed in FIG. 7, which are the forward and right-hand sides of the disc, as the machine is viewed in FIG. 6. Bolted to flat 296 is a lug 298. A cam follower roller 300 is rotatably mounted at the end of lug 298. This roller is located in the plane of and engages the arm 288 of the bell crank lever 282, so that when the latter arm swings to the right, in FIGS. 6 and 6*a*, it pushes against the cam follower roller 300, and rotates the drill holder 38 in a counterclockwise direction, as the machine is viewed from the top in FIG. 2. This counterclockwise swinging of the drill holder rotates the drill head structure 88 toward the grinding wheel 36.

Bolted to the other flat 294 of the disc 292 on the lower end of the drill holder post 90 is a second lug 302 having a radially projecting finger 304 of rectangular cross-section. Indicated at 306 is a yieldable biasing means which acts on the finger 304 in a direction to bias the drill holder 38 in a clockwise direction, as the machine is viewed from the top. Yieldable means 306 comprises a sleeve 308, the left-hand end of which, as it is viewed in FIG. 9, is threaded in a depending arm 310 on a plate 312 which is bolted to the drill holder supporting sleeve 94. Slidable in this sleeve is a plunger 314 having a slot in its left-hand end in which is rotatably mounted a roller 316. A spring 318 acting between the right-hand end of the sleeve 308 and the plunger 314 biases the latter in the direction of the radial finger 304 on the lower end of the drill holder 38. A stem 320, threaded in the plunger 314 and extending slidably through a hole in the right-hand end of the sleeve 308, has an enlarged head 322 for limiting left-hand travel of the plunger 314 in the sleeve.

From the description of the present grinding machine thus far, it will be apparent that when the hydraulic motor 224 is operating, the chuck 114 within the head structure 88 of the drill holder 38 and the cam 240 are rotated in synchronism. Rotation of the cam 240 acts to swing the bell crank lever 282 in one direction, thereby to rotate the drill holder in a counterclockwise direction on the axis of its post 90, while the yieldable means 306 acts to rotate the drill holder in the opposite direction. Accordingly, the drill holder is oscillated, by the combined action of the cam 240 and yieldable means 306, in timed relationship with respect to rotation of the chuck 114 in the head structure 88 of the drill holder.

It has already been mentioned that the shaft portion 268 on which the bell crank lever 282 is rotatably supported is eccentric with respect to the coaxial ends of the shaft, as illustrated most clearly in FIGS. 6*c* and 6*d*. It will be apparent, therefore, that the pivot axis A of the bell crank lever may be shifted by turning its pivot shaft 262 in one direction or the other. In the normal position of the pivot shaft 262, the axis of the coaxial ends of the shaft 262 and the axis of the eccentric shaft portion 268 are located in a common vertical plane P1.

If the pivot shaft 262 is turned in a clockwise direction, as viewed in FIG. 6*c*, the pivot axis for the bell crank lever 282 is shifted to the right and down. This has a two-fold effect. First, the effective length of the vertical bell crank lever arm 288 between its pivot axis A and the point of contact of the arm with the drill holder roller 300 with the result that arc of oscillation of the drill holder 38, for a given angle of swing of the bell crank lever, is increased. Secondly, the bell crank lever is bodily shifted to the right and the drill holder 38 is rotated in a counterclockwise direction (as viewed in FIG. 2) by a corresponding amount. Turning of the pivot shaft 262 in the opposite direction, of course, has the opposite effect.

Turning of the pivot shaft 262 thus provides a means for gradually feeding the oscillating head structure 88 of the drill holder 38 toward the grinding wheel 36 during operation of the machine, as will be hereinafter more fully described. Turning of the pivot shaft for this purpose is accomplished as follows. Fixed to the extending right-hand end of the pivot shaft 262, as the latter is viewed in FIG. 8, is a radial arm 324. The outer end of this arm is pivotally attached to a head piece 326 fixed to the upper end of a vertical piston rod 328. The lower end of the piston rod 328 is connected to a piston 330 (FIG. 3) which moves in a cylinder 332 rockably connected at its lower end by a pivotal mounting 334, to the machine housing 32, for rocking of the cylinder 332 on an axis parallel to the pivot shaft 262. As will presently be described, the machine embodies a hydraulic system including means for selectively admitting pressure fluid to and venting opposite ends of the cylinder 332 through hydraulic lines 336 and 338 to cause movement of the piston 330 therein. Downward movement of the piston 330 in its cylinder turns the pivot shaft 262 for the bell crank lever 282 in a clockwise direction to feed the drill head 88 toward the grinding wheel 36. Upward movement of the piston 330 in its cylinder retracts the drill head from the grinding wheel.

As mentioned earlier, during operation of the machine, the drill holder 38 is raised and lowered simultaneously with and in timed relationship to its oscillation. This vertical movement of the drill holder is accomplished as follows.

A lever 340 (FIG. 7) has a slot intermediate its ends in which is rotatably mounted a cam follower roller 342. This roller is engageable with the edge of cam 238. The lower end of the lever 340, which is the left-hand end of this lever as the machine is viewed in FIG. 6, is bifurcated and hingably connected to the lower end of a vertical piston rod 344.

Piston rod 344 extends upwardly into a cylinder unit 346. This cylinder unit is located exteriorly of the machine housing 32, at the forward side of the latter, as may be seen in FIG. 1. The lower end of the cylinder unit has a threaded nipple 348 which is threaded in the upper panel of a rectangular enclosure on the forward side of the machine housing. The forward side of this enclosure is closed by a removable panel 352 which may be removed for servicing purposes, FIG. 11 being a view of this part of the machine, with the front panel 352 removed.

Movable in the cylinder 346 is a piston 354 which is connected to the piston rod 344. The piston illustratively comprises a pair of flexible cups 356 separated by a washer 358 and clamped between a pair of collars 360. One collar engages a shoulder 362 on the piston rod, the other collar being threaded on the piston rod as shown.

Hydraulic fluid is admitted to and exhausted from opposite ends of the cylinder 346, to cause movement of the piston 354 therein through a pair of hoses 364 and 366. These hoses, or fluid lines, will be referred to in the subsequent description of the hydraulic system of the machine.

Fitted in opposite ends of the cylinder 346 are end caps 368 and 370. These end caps have axially extending passages 372 and 374 which communicate the cylinder spaces at opposite sides of the piston 354, with the passages in the fluid lines 364 and 366, respectively. The end caps 368 and 370 also have inwardly opening, axial bores 376 and 378 in which plunger portions 380 and 382 on the collars 360 have a close sliding fit. O-rings are placed adjacent the inner ends of the bores 376 and 378 to seal against fluid leakage between the walls of the bores and plunger portions on the collars 360. The bottom of each bore communicates with the cylinder space on the adjacent side of the piston 354 through a passage 384 in which is located a ball-type, spring biased check valve 386.

Engagement of the plunger portions 380 and 382 in their respective bores 376 and 378 serves to decrease the rate of travel of the piston 354 at the ends of its strokes. That is, when either plunger portion 380 or 382 enters its respective bore, the hydraulic fluid trapped in the outer end of that bore must be displaced through the respective passage 384 and past its check valve 386. The rate at which this trapped fluid can escape is dependent on the size of the passages 384 and determines, of course, the rate in which the piston will travel at the ends of its stroke.

The upper end of the piston rod 344 is reduced slightly in diameter and extends past an O-ring seal into a threaded bore 388 in the upper cylinder end cap 370. Threaded in this bore is an adjustable stop screw 390 which is engageable with the upper end of the piston rod 344 to limit its upward travel in the cylinder. The stop screw 390 is adjustable by means of a knurled cap 392 fixed to the screw and fitting loosely over the reduced upper end of the upper end cap 370, as shown.

It will be seen that the pivotal connection between the lever 340 and the piston rod 344 provides a fulcrum upon which the lever is adapted to swing. The cam 238, which is engaged by the cam follower roller 342 on the lever 340, is shaped to produce predetermined swinging movement of the lever on this fulcrum, as will be presently more fully explained. Swinging of lever 340 imparts vertical axial movement to the drill holder 38, as follows. As shown most clearly in FIG. 7, the upper end of the lever 340, which is the right-hand end of the lever as the latter is viewed in FIG. 6, has a pair of fork arms 394 which straddle the lower end of the drill holder drive shaft 200. Rotatably mounted in the outer sides of these arms are coaxial rollers 396, the common axis of which is located in the axial plane of the drill holder post. These rollers engage the underface of the disc 292 on the lower end of the post.

From this description, it will be clear that when the right end of the lever 340 rocks upwardly, it elevates the drill holder 38. When the right end of the lever rocks downwardly, the drill holder 38 tends to descend under its own weight. However, in order to cause the drill holder to follow more accurately the movements of the lever 340, the drill holder is biased in a downward direction by a yieldable means 398, which may be observed most clearly in FIGS. 6 and 9. This yieldable means comprises a plunger 400 which is movable in a vertical bore 402 formed in and opening through an underface of the supporting plate 312 for the yieldable means 306, previously described. A spring 404 acting between the plate 312 and plunger 400 urges the latter in a downward direction. Downward movement of the plunger is limited by engagement of a head 406 on a stem 408, secured to the plunger 400 and extending through a reduced bore on the upper end of the plate 312, with the upper face of the plate.

The lower end of the plunger 400 is slotted. Rotatably mounted within this plunger slot is a roller 410. Roller 410 engages the upper face of the finger 304 which, as previously described, is carried on the lower end of the drill holder post 90. It is evident, therefore, that the yieldable means 398 acts on the finger 304 to bias the drill holder 38 downwardly, as just mentioned.

From what has been said thus far, it will be clear that the drill holder 38 is oscillated on the axis of its post 90, by the combined action of cam 240 and yieldable means 306, and simultaneously reciprocated along this axis in timed relationship to its oscillation, by the combined action of cam 238 and yieldable means 398. Chuck 114 within the head structure 88 of the drill holder, of course, is continuously rotated during and in synchronism with this oscillation and axial reciprocation of the drill holder. It will be observed that during oscillation of the drill holder, the disc 292 on the lower end of the drill holder post 90 rotates on the rollers 396 on the drill holder elevating lever 340, and the roller 410 embodied in the vertical acting, drill holder biasing means 398 rolls on the upper surface of the drill holder finger 304. Similarly, during axial reciprocation of the drill holder, the roller 300 on the lower end of the drill holder post rolls along the vertical arm 288 of the bell crank lever 282 and the roller 316 embodied in the horizontally acting drill holder biasing means 306 rolls on the vertical side face of the finger 304.

The cylinder assembly 346 provides a means for elevating the drill holder 38 to a predetermined position at the start and finish of each grinding operation to permit initial aligning of the drill to be pointed and automatic ejection of the pointed drill from the drill holder at the end of the grinding operation. Thus, referring to FIG. 6, it will be evident that admission of hydraulic fluid to the upper end of the cylinder 346 through the hydraulic line 364 and venting of the lower end of the cylinder through the line 366 results in downward movement of the piston 354. This downward movement of the piston rocks the drill holder elevating lever 340 in a counter-clockwise direction about its cam follower roller 342 as a center and elevates the drill holder 38, as just mentioned. Subsequent upward movement of the piston 354 to its normal position of FIG. 6, by venting of the upper end of the cylinder through line 364 and admission of pressure fluid to the lower end of the cylinder through line 366 rocks the lever 340 in a clockwise direction back to its position of FIG. 6 and lowers the drill holder 38 to its grinding position.

Upward movement of the piston 354 in its cylinder 346 is limited, as previously described, by engagement of the upper end of its piston rod 344 with the adjustable stop screw 390. It is evident therefore that the vertical position occupied by the drill holder 38, when the piston 354 is in its upper limiting position of FIG. 6, may be adjusted by adjusting the position of the stop screw 390.

It is desirable, for reasons to be presently seen, that the drill holder 38 be brought to rest in a predetermined position at the end of each grinding operation. This is accomplished by the action of an indexing mechanism 412 (FIGS. 10 and 10*a*), including the previously mentioned indexing collar 222, keyed to the motor shaft 228 and the gear box shaft 220. This indexing mechanism comprises a pivoted pawl 414 which is engageable in a notch 416 in the periphery of the indexing collar 222. Pawl 414 is pivotally attached to the end of a piston rod 418 which extends to the exterior of the gear box 210 through an opening 420 in the latter.

The outer end of the piston rod 418 carries a piston 422 which is movable in a bore 424 formed in a block 426 which is fixed to the outside of the gear box. Sealing means 428 provide a fluid-tight seal between the piston rod 418 and the block 426 at the open end of the bore or cylinder 424. A fluid line 430 is provided for conveying pressure fluid to the cylinder 424 to retract pawl 414 against the action of a spring 432, as will be hereinafter more fully discussed. Suffice it to say for now, that the pawl 414 may be extended toward or retracted from the indexing collar 222 by appropriate admission of pressure fluid to and venting of the cylinder 424. During operation of the machine, the pawl 414 is urged against the indexing collar 222 during shut-down of the machine, engagement of the pawl in the notch 416 of the collar serving to bring the parts of the machine to rest in a predetermined position.

As mentioned earlier, the drill to be pointed is initially axially positioned and angularly aligned at the outset of a grinding operation and is automatically ejected from the drill holder 38 at the conclusion of the grinding operation. The means for accomplishing this initial alignment and final automatic ejection of the drill will now be described by reference to FIGS. 1, 3, 4, 4*a* and 4*b*.

Extending across the open top of the upper housing shell 34, just to the right of the shell cover plate 40, as the machine is viewed in FIG. 1, is a supporting plate 434. This supporting plate is attached to the upper edge of the flange 34 by means of bolts 436 which pass through slots 438 in the plate. Slots 438 accommodate limited adjustment of the supporting plate 434 toward and away from the drill holder 38. Plate 434 has a slot 440 opening through its right-hand edge, as viewed in FIG. 1, which is the left-hand edge of the plate as the machine is viewed in FIG. 3. This slot is vertically aligned with the drill bushing 108 in the drill holder 38 when the latter is in its position of FIGS. 1, 2 and 3.

Located within the open end of this slot is a drill locating means 442, which is shown in detail in FIGS. 4*a* and 4*b*. This aligning means comprises a supporting bar 444, depending from the center of which is a rigid rectangular supporting post 446. Fixed to the lower end of this post is an aligning sleeve 448, the axis of which is parallel to the plane of and perpendicular to the length of the supporting bar 444. The left-hand end of the aligning sleeve is formed with conventional means 450, such as shown in Patent No. 2,147,227, for example, which are effective to rotate a twist drill to a predetermined angular position when the tip of that drill is forced against the end of the sleeve.

The aligning means 442 is secured to the upper side of the supporting plate 434 by means of bolts 452 which pass through holes in the opposite ends of the aligning means support bar 444 and are threaded into the supporting plate 434. The bar is spaced above the plate by means of spacer sleeves 454 on the bolts 452. In the assembled position of the aligning means 442 on the supporting plate 434, the aligning sleeve 448 is located slightly below the underside of the plate 434, as may be observed best in FIGS. 3 and 4. The aligning means is so arranged that the axis of its sleeve 448 will be exactly coincident with the axis of the drill bushing 108 in the drill holder 38 when the latter is elevated and rotated to its drill alignment and ejection position of FIG. 4. As will be presently seen, the drill holder is elevated to this position by operation of the cylinder assembly 346, as was previously briefly discussed, and is initially angularly located in the proper position by the indexing means 412 previously discussed.

Slidable in the central opening in the drill aligning sleeve 448 is a drill ejection rod 456. The right-hand end of this rod, as the latter is viewed in FIG. 3, is secured to a vertical arm 458 which extends upwardly through the slot 440 in the supporting plate 434 and is attached to one end of a piston rod 460. These parts comprise a drill ejection means 462 which is completed by a hydraulic cylinder 464 in which is movable a piston (not shown) fixed to the right-hand end of the piston rod 460. The left-hand end of the cylinder 464 is supported by an L-shaped bracket 466 on the supporting plate 434 at the base of its slot 440. The drill aligning means 442 and ejection means 462 are thus adjustable with the supporting plate 434 toward and away from the drill holder 38.

As shown most clearly in FIG. 1, a pair of fluid lines 470 and 472 are connected to opposite ends of the drill ejection cylinder 464. During operation of the machine, as will presently be described, the drill ejection cylinder is pressurized and vented through these lines to effect left-hand movement of the ejection rod 456 (as viewed in FIG. 3) in the drill aligning sleeve 448 when the drill holder is in its position of FIG. 4 to eject a finally ground drill from the drill holder.

The grinding wheel 36 has a bevelled or inclined peripheral grinding surface 36*a* which terminates in an upper circular grinding edge 36*b* at the juncture of the peripheral grinding surface 36*a* with the upper side face of the grinding wheel. As preliminarily mentioned and hereinafter more fully described, a drill is pointed by the grinding surface 36*a* and relieved by the grinding edge 36*b*. It will be obvious that if a drill is to be accurately pointed and relieved, the grinding wheel 36 must be accurately dressed and located relative to the drill holder. The numeral 474 in FIG. 1 denotes a dressing attachment for dressing the grinding wheel and locating it relative to the drill holder. This dressing attachment will now be described by reference to FIGS. 1 through 3 and 16 through 20.

As described earlier, the support 47, 58 for the grinding wheel 36 and its motor 80 comprises a movable carriage which is supported on the machine housing 32 for adjustment toward and away from the drill holder 38. Joined to the left-hand side of the grinding wheel carriage plate 58, which is the forward side of the plate as the machine is viewed in FIG. 1, is a block 476. This block projects through the rectangular opening 60 in the front side of the machine housing 32. Integrally joined with this block and projecting forwardly of the machine housing is a hand wheel support 478 including a forward part 480 and a rear part 482.

Extending through the rear part 482 of the hand wheel support 478, parallel to the direction of movement of the grinding wheel supporting carriage 47, 58 on the machine housing 32, is a screw shaft 484. The lower end of this screw shaft, as the latter is viewed in FIG. 17, extends through a bore 486 in a block 488. This block has a depending flange 490, shown most clearly in FIG. 16, which is bolted to the front wall of the machine housing 32. Threaded on the screw shaft 484 at opposite sides of the block 488 are a pair of jam nuts 492 which rigidly lock the screw shaft against rotation as well as axial movement in the block 488.

Located within the rear part 482 of the hand wheel support 478 is a bevelled gear 494 having an integral, internally threaded sleeve 496 which is threaded on the shaft 484. This bevelled gear sleeve is rotatably supported by the inner races of a pair of ball bearing units 498 which are positioned within an axial bore of an end cap 500 threaded in the housing part 482. The end of the bevelled gear sleeve 496 is counterbored to receive the upper end of a lock nut sleeve 502 which is also threaded on shaft 484. This lock nut sleeve is externally threaded and mounts a jam nut 504. The bevelled gear 494, lock nut 502 and jam nut 504 are retained against axial movement in the ball bearings 498 by shoulders 506 and 508 on the bevelled gear and jam nut, respectively, between which the ball bearings 498 are located. The bearings themselves are retained against axial movement in the end cap 500 by a bearing retainer 510. The other end of the shaft 484 projects through an opening in the housing part 482, the exposed end of the shaft being covered by a cap 512.

Bevelled gear 494 meshes with a second bevelled gear 514. This second bevelled gear has an integral sleeve hub 516 supported in the inner race of a ball bearing unit 518 for rotation on a horizontal axis perpendicular to the axis of the shaft 484. Ball bearing 518 is fixed in the axial bore of a second end cap 520 threaded in the housing part 482 at right angles to the end cap 500. Dirt seals for the bearings 498 and 518 are placed, as shown.

Indicated at 522 is a short lead screw having a reduced diameter right-hand end 524, as viewed in FIG. 17, which extends through the central opening in and is pinned to the second bevel gear 514. The opposite end of the lead screw 522 extends through an opening 526 in the forward end of the housing part 480 and mounts a hand wheel 528 by which the lead screw 522 may be rotated in either direction.

It will be apparent from the description of the dressing attachment 474 thus far that rotation of the crank 528 imparts rotation to the bevel gear 494 and its lock nut sleeve 502 on the threaded shaft 484. This rotation of the bevel gear 494 and lock nut sleeve 502 on the shaft 484 causes movement of the hand wheel support 478, and the grinding wheel supporting carriage 47, 58 connected thereto, toward and away from the drill holder 38.

Press-fitted at one end in the grinding wheel carriage block 476 and extending forwardly of the machine therefrom are a pair of supporting shafts 530. Slidably supported on these shafts for movement toward and away from the grinding wheel 36, in a direction perpendicular to the direction of adjustment of the grinding wheel relative to the drill holder 38, is a carriage 532 on which the grinding wheel dressing head 534 is mounted. As illustrated most clearly in FIG. 1, the dresser carriage 532 comprises a lower rectangular block 536 having a pair of parallel bores 538 through which the supporting shafts 530 extend. Sleeve bearings 540 (FIG. 16) are press-fitted in these bores, the dresser carriage 532 being slidably supported on the shafts 530 by means of ball bearing units located in the annular space between the shafts 530 and sleeve bearings 540.

Depending from the underside of the dresser carriage block 536 is a rectangular arm 544 which extends downwardly through the forward bracket-shaped part 480 of the hand wheel support 478. This arm has a bore 546 through which the hand wheel lead screw 522 extends. A sleeve nut 548, threaded on the hand wheel lead screw 522, is positioned in the bore 546 of the arm 544 and has a flanged forward end bolted to the arm, as shown most clearly in FIG. 17. The forward end of the central opening in the nut 548, which is the left-hand end of the nut as the latter is viewed in FIG. 17, is counterbored to receive a lock nut 550, also threaded on the lead screw 522. The lock nut 550 has a flanged head carrying stop pin 552, the projecting heads of which are engageable with the head of the nut 548.

From this description, it will be seen that when the lead screw 522 is rotated by turning the hand wheel 528, the dresser carriage 532 is moved either toward or away from the grinding wheel 36, depending on the direction of rotation of the hand wheel.

The dresser carriage block 536 has an upper, upstanding flange 554 (FIGS. 18–20). Bolted to this flange is a vertical dresser head support 556. This head support is made up of a lower plate 558, which is shaped as illustrated most clearly in FIG. 19, so as to have an upstanding tongue 560, and an upper plate 562 which is bolted to the tongue 560 of the lower plate 558.

Upper plate 562 of the dresser head support 556 is slotted at 564 to receive one end of the dresser head 534. Pointed hinge pins 566 extending through the plate arms 568, at opposite sides of the plate slot 564, and engaging in the ends of a bore in the dresser head 534, support the latter on the support 556 for vertical swinging movement on an axis parallel to the direction of movement of the dresser carriage 532 on the supporting shafts 530.

The dresser head 534 comprises a cylindrically enlarged outer end 570 from which projects an apertured, radial tongue 572. This tongue is hinged to the upper end of a piston rod 574 which is fixed at its lower end to a piston (not shown), movable in a double acting hydraulic cylinder 576. The lower end of this cylinder is hinged at 578, for swinging on an axis parallel to the pivotal axis of the dresser head 534, on a bracket 580 fixed to the forward side of the dresser carriage block 536 and its upstanding flange 554. Fluid lines 582 and 584 are connected to opposite ends of the cylinder 576. As will be presently more fully described, the opposite ends of the dresser cylinder 576 are alternately supplied with hydraulic fluid and vented to cause rocking of the dresser head 534 about the axis of its hinge pins 566.

The cylindrical enlargement 570 of the dresser head 534 has an axial bore 586 in which is press-fitted a sleeve bearing 588. This sleeve bearing extends beyond the end of the cylindrical enlargement toward the grinding wheel 536, as shown most clearly in FIG. 18.

Slidably supported for axial movement within the sleeve bearing 588, by means of a ball bearing 590, is a dressing tool supporting shaft 592. The left-hand end of the shaft, as is viewed in FIG. 18, extends beyond the adjacent end of the sleeve bearing 588 and is formed with an annular shoulder 594. A conical coil spring 596, acting between this shoulder and the adjacent end of the sleeve bearing 588, urges the shaft 592 in the direction of the grinding wheel 36. This spring is enclosed by a conical, bellows type sleeve 598.

Shaft 592 has a reduced left-hand end extension 600 which projects beyond the spring cover 598 and mounts a vertical, depending arm 602. This arm extends downwardly into the well 35 defined by the upstanding flange 34 on the machine housing. Rigidly fixed in the lower end of this arm is a diamond tipped dressing tool 604. When the dressing attachment 474 is in the position of FIGS. 18 through 20, the dressing tool 604 is resiliently urged against the edge of the grinding wheel 36 by the action of the dresser spring 596. In FIG 18, it will be observed that the dressing tool engages the grinding wheel on its center line.

The end of the dresser tool supporting shaft 592, remote from the grinding wheel 36, extends a distance beyond the adjacent side of the dresser head 570 and mounts a rigid depending arm 606. Rigidly mounted in the lower end of this arm is a pointed, cam follower pin 608. The pointed end of the cam follower pin 608 in engageable with a cam surface 610 formed on a cam block 612. This cam block is bolted to one side edge of a supporting plate 614 which, in turn, is bolted to the forward edge of the upper dresser head supporting plate 562.

Cam surface 610 has an upper inclined section **610*a* and a lower vertical section 610*b*. The inclination of the cam surface section 610*a* is made the same as the desired slope of the bevel grinding surface 36*a* on the grinding wheel 36. The cam block 612 is so vertically located that the line of intersection between the inclined cam surface 610*a* and the vertical cam surface 610*b* is located in the plane of the circular line of intersection of the bevelled grinding surface 36*a* on the grinding wheel 36 with its lower cylindrical surface 36*c***.

From this description of the dressing attachment, it will be seen that when the dresser head 534 is rocked on the axis of its pivot 566 by operation of the hydraulic cylinder 576, the cam follower pin 608 rides up and down on the cam surface 610, the cam follower pin being retained in contact with the cam surface by the dresser head spring 596. The dressing tool 604, of course, moves up and down with the dressing head and its point obviously follows a path of movement corresponding to the shape of the cam surface 610. Clearly, therefore, as the dresser head 534 is rocked up and down, the dressing tool 604 will dress the edge of the grinding wheel to provide it with the exact desired contour illustrated. The bevelled grinding surface **36*a*** will thus be dressed to axactly the proper angle for pointing drills.

The cam block 612 is removable for replacement by one having a differently inclined cam surface, if desired, so as to permit grinding of any desired point angle on a drill.

It is evident that when the edge of the grinding wheel 36 is dressed in the manner just described, its diameter is descreased. Unless the position of the grinding wheel with respect to the drill holder 38 was changed to compensate for this decrease in the diameter of the wheel, the spacing between the latter and the drill holder for any given position of the latter would change. Such a change in the spacing between the grinding wheel and drill holder obviously would effect the accuracy of the machine. Accordingly, when the grinding wheel is dressed, it is essential that it be moved toward the drill holder 38 by an exact amount equal to the decrease in the radial dimension of the wheel during the dressing operation. This adjustment of the grinding wheel toward the drill holder to compensate for the decrease in its radial dimension during dressing is accomplished automatically by the action of the dresser carriage adjusting means described previously.

Thus, during a dressing operation, the dresser head 534 and the dressing tool 604 carried thereon are fed toward the grinding wheel by turning the dresser adjusting hand wheel 528 in the appropriate direction. It will be recalled that this rotation of the hand wheel also effects movement of the grinding wheel carriage 47, 58 in the direction of the drill holder 38. Shaft 484 and lead screw 522 have threads of the same pitch, and the bevelled gears 494 and 514 have the same number of teeth. Thus, when hand wheel 528 is turned to feed the dressing tool 604 against the grinding wheel 36, the grinding wheel is advanced toward the drill holder 38 exactly the same distance as that through which the dressing tool 604 is advanced toward the grinding wheel. Since the distance through which the dressing tool is advanced is the same as the decrease in radial dimension of the wheel, it is evident that the bevelled grinding surface **36*a* and circular grinding edge 36*b*** on the grinding wheel will always occupy exactly the same position relative to the drill holder before and after each wheel dressing operation.

The operating cycle of the machine will now be described by reference to FIG. 21.

The hydraulic system of the machine is powered by an electric motor 616 which drives an hydraulic pump 620. Motor 616 is started by pushing a main start button 618 on the front side of the machine base 30 in FIG. 1. The suction side of the pump 620 is connected through a filter 622 to a hydraulic fluid reservoir or tank 624. When operating, pump 620 pumps hydraulic fluid from the tank to a main hydraulic supply line 626 to which is connected an hydraulic accumulater 628.

Indicated at 630, 632, 634, 636, 638 and 640 are six solenoid operated valves which control the flow of hydraulic fluid from line 626 to the six hydraulic cylinders contained in the machine, namely, chuck operating cylinder 154, the drill holder elevating cylinder 346, feed cylinder 332, index stop cylinder 424, drill ejecting cylinder 464, and the dresser cylinder 576, respectively. Normally, that is prior to initiation of a grinding cycle, these valves are positioned as shown in FIG. 21.

In the normal position of the drill chuck control valve 630, the chuck cylinder 154 is vented to the hydraulic return line 642. The chuck piston 156 is thus retained in its retracted position by its biasing springs 136 and the pressure on the chuck jaws 130 is relieved. In the normal position of the drill holder elevation control valve 632, the lower end of the drill holder elevating cylinder 346 is vented to the return line 642 and the upper end of the cylinder is connected to the supply line 626. The drill holder elevating piston 354 is thus held in its lower limiting position to position the drill holder 38 in an initial predetermined elevated position.

In the normal position of the feed cylinder control valve 634, the upper end of the feed cylinder 332 is vented to the return line 642 and the lower end of the cylinder is connected to the supply line 626. The feed piston 330 is thus held in its upper limiting position wherein the pivot shaft 262 for the drill holder oscillating bell crank lever 282 is rotated to its counterclockwise limiting position. It will be recalled that in this position of the pivot shaft, the axis of its eccentric midsection 268 (FIG. 6*c*) is located above and in the vertical plane of the axis of the pivot shaft end sections. The rotatably acting biasing means 306 for the drill holder, of course, urges the roller 300 on the drill holder against the bell crank arm 288 to position the drill holder in an initial predetermined angular position.

As will presently be seen, the gear box shaft 208 and, therefore, the drill holder oscillating and elevating cams 238, 240 are, at this time, locked in a predetermined angular position by the indexing means 412. The drill holder 38 is therefore held in the predetermined initial position of FIGS. 4 and 14*a* wherein, as previously mentioned, the axis of its drill bushing 108 is coaxial with the locating sleeve 448 of the drill locating means.

At this time hydraulic fluid is supplied to the hydraulic motor 224 in the reverse direction but is locked against rotation by the indexing stop 414. The drill ejection piston 460 is presently retained in its retracted position and the dresser piston 574 is retained in its lowered position wherein the dressing tool 604 is located below the grinding wheel 36.

The operator now inserts a drill D (FIGS. 14 and 15) to be pointed through the grooves 132 in the chuck jaws 130 of the drill holder and through its bushing 108 until the drill tip abuts against the end of the drill locating sleeve 448. The drill locating means 450 on the sleeve turn the drill to a predetermined angular position in the drill holder head 88. The locating means also act as a stop to axially locate the drill.

Finally, the grinding cycle is initiated by pushing a cycle start button 644 on the end of the machine base 30 adjacent the drill holder 38 (FIG. 6) to operate a cycle start switch 646.

Operation of switch 646 momentarily energizes the left-hand solenoids of the chuck control valve 630 and drill holder elevation control valve 632 and shifts these valves to their left-hand positions wherein hydraulic fluid is supplied to the chuck cylinder 154 and the hydraulic connections to the drill holder elevation cylinder 346 are reversed. The drill holder chuck piston 156 is thereby forced to the right in FIG. 4 to cam the chuck jaws 130 inwardly into clamping engagement with the shank of the drill. The drill D is thus gripped by the chuck 114 with the drill tip extending slightly beyond the end of the drill bushing 108, as shown. Also, the drill holder elevating piston 354 is raised in its cylinder 346 to the upper limiting position determined by the setting of its adjustable stop 390 (FIG. 6) with resultant lowering of the drill holder 38 to its position of FIG. 14*b* under the combined action of the weight of the holder and the vertically acting biasing means 398 (FIG. 9) for the holder.

During this descent of the drill holder, it is located in its initial predetermined angular position, previously discussed, wherein the drill tip clears the edge of the grinding wheel. This permits the drill head 88 to drop to the position of FIG. 14*b*, in which the head is located for the commencement of the actual grinding operation, without the drill tip striking the grinding wheel 36.

Predetermined upward movement of the drill holder elevating piston 354 effects operation of a microswitch 648, as follows. In FIGS. 6 and 11, it will be observed that the drill holder elevating piston rod 344 has an axial extension 344' extending below the drill holder elevating lever 340. Fixed to and extending laterally from the lower end of this extension is an arm 650.

Microswitch 648 includes a pivoted actuating member 652 having a roller 654 at its outer end which engages the upper side of the elevating arm 650. During upward movement of the arm 650 with the drill holder elevating piston 354, at the start of the grinding cycle, the arm engages the roller 654 to operate the microswitch 648.

Returning now to FIG. 21, switch 648, when thus operated, energizes, through the normally closed contacts 658—1 of a pressure switch 658 which is in its normal condition at this time, the left-hand coil of the feed control valve 634 and the motor control valve 636. Thus, these latter valves are shifted to their left-hand positions wherein the hydraulic connections to the hydraulic motor 224 and the feed cylinder 332 are reversed.

Hydraulic fluid is now fed to the upper end of the feed cylinder 332 through line 336 which has a needle valve 660 therein. This needle valve is adjusted by a handle 662 on the forward panel of the machine base 30 in FIG. 6 and is set so as to give a predetermined, relatively slow descent of the feed piston 330 in its cylinder. The pivot shaft 262 for the bell crank lever 282 is thereby slowly turned in a clockwise direction, as viewed in FIG. 6*c*, from its initial counterclockwise limiting position.

Reversal of the hydraulic connections to the hydraulic motor 224 results in hydraulic fluid feeding to the motor in the forward direction through a needle valve 664 which is adjustable, to control the speed of the motor, by a handle 666 on the front of the machine in FIG. 1. Hydraulic fluid, of course, now flows to the indexing stop cylinder 424 to retract the indexing stop 414 (FIG. 10) so that the hydraulic motor 224 may rotate.

It will be recalled that this motor drives the drill holder elevating and oscillating cams 238 and 240 and the chuck 114 in the drill holder 38, so that the latter is simultaneously reciprocated along and oscillated on the axis of its post 90 (FIGS. 14*b* and 14*c*) while the chuck 114 and drill D gripped therein are rotated in synchronism with the reciprocation and oscillation of the drill holder. As will shortly be more fully explained, these synchronized movements are so timed and proportioned that the tip of the rotating drill is fed past the bevelled grinding surface **36*a* and circular grinding edge 36*b* of the grinding wheel 36** in a series of passes in such manner that the drill tip is pointed and relieved in the manner preliminarily mentioned.

As just mentioned, the pivot shaft 262 for the bell crank lever 282 is, at this time, being slowly turned in a clockwise direction.

As explained earlier, this slow clockwise rotation of the bell crank pivot shaft produces a gradual advance or feed of the drill head 88 toward the grinding wheel 36, with the result that on each successive pass of the drill D past the grinding wheel 36, the drill is fed a bit further toward the wheel. The needle valve 664 permits the speed of operation of the machine during the grinding cycle to be set, as desired.

The drill continues to be periodically fed toward and past the grinding wheel in the manner just described until the feed piston 330 reaches the lower end of its cylinder 332. At this time, the pivot shaft 262 for the bell crank lever 282 will have been turned to its phantom clockwise limiting position of FIG. 6*c*, so that inward feeding of the drill toward the grinding wheel is discontinued. The drill holder continues to be reciprocated and oscillated, however, so that drill D continues to be fed past the grinding wheel until the drill "sparks out."

Pressure switch 658 comprises a piston 668 movable in a cylinder 670. The contacts of switch 658 are operated by movement of this piston, as shown. One end of the cylinder 670 is connected through a hydraulic line 672 to the upper end of the feed cylinder 332. Hydraulic fluid entering the pressure switch cylinder through the hydraulic line 672 tends to move the piston 668 against the action of a spring 676 in a direction to open the normally closed contact 658—1 of the switch and close its normally open contact 658—2.

The tension of the pressure switch spring is set so as to restrain the pressure switch piston 668 against movement under the action of the reduced pressure in the feed cylinder 332 during the descent of the feed piston 330 to feed the drill D toward the grinding wheel, in the manner just described. When the feed piston 330 reaches the end of its stroke, of course, the fluid pressure in the upper end of the feed cylinder 332, and hence the pressure acting on the pressure switch piston, builds up to a value wherein the pressure switch spring 676 is overcome with resultant opening of the normally closed pressure switch contacts 658—1 and closing of its normally open contacts 658—2. The pressure switch is designed to introduce a slight delay before its contact 658—1 is opened to allow the drill to "spark out," as just mentioned.

The normally open pressure switch contact 658—2 are in series with a microswitch 678. Referring to FIGS. 6 and 11, switch 678 will be seen to be located within the housing enclosure 350 of the machine, below the drill holder oscillating cam 240. Mounted on the outside of this cam is a second, smaller diameter cam 680. Cam 680 has, at one point of its periphery, a raised portion 682 which is engageable with the plunger 684 of switch 678. Once during each revolution of the gear box shaft 234, this raised cam portion engages a plunger 684 of the switch 678 to close its normally open contacts. The cam 680 is made adjustable by the bolt and slot means 686 which mount the cam to the drill holder oscillating cam 240 and is set so as to cause operation of switch 678 when the drill holder 38 is in a predetermined position.

From this description, it will be seen that prior to closure of the pressure switch contact 658—2, the periodic closures of the switch 678 which occur as a result of rotation of the cam 680 during the drill grinding operation just described have no effect. The first closure of switch 678 following the closure of the pressure switch contacts 658—2 at the end of the stroke of the feed piston 330 completes a circuit through and energizes the right-hand coils of the chuck control valve 630, the drill holder elevation control valve 632, the feed cylinder control valve 634 and the motor control valve 636.

Energizing of the right-hand coils of these four control valves operates the latter to their normal positions of FIG. 21 and results in release of the clamping pressure on the chuck jaws 130, readmission of hydraulic fluid to the upper end of the drill holder elevating cylinder 346, readmission of hydraulic fluid to the lower end of the feed cylinder 332, and readmission of hydraulic fluid to the hydraulic motor 224 in the reverse direction. The drill D is thereby released by the chuck 114 in the drill holder 38, the drill holder is elevated to its initial position of FIG. 14*a* (FIG. 14*d*) wherein its drill bushing 108 is again coaxial with the drill locating sleeve 448 of the drill locating means 442, the pivot shaft 262 for the bell crank lever 282 is rotated to its initial counterclockwise limiting position, and hydraulic fluid pressure is removed from the index stop cylinder 424, so that the index stop 418 is reengaged by the action of its spring 432. In FIG. 21, it will be observed that the needle valve 660 in the feed cylinder hydraulic line 336 is bypassed by a check valve 688 which unseats to permit rapid return of the feed piston 330 to its upper position and, therefore, the bell crank pivot shaft 262 to its counterclockwise limiting position.

During descent of the drill holder elevating piston 354 to its lower limiting position, as a result of operation of its control valve 632 to its normal position of FIG. 21, switch 648 is, obviously, reopened. Also, near the end of its stroke, a switch 690 is closed. Referring to FIGS. 6 and 11, switch 690 will be seen to be mounted within the machine housing enclosure 350 and to have a plunger 692 which is engaged by a second horizontal arm 694 on the lower end of the drill holder elevating piston rod 344 during descent of the latter at the end of the grinding cycle. Switch 690 operates a time relay 696 to momentarily close its contacts 696—1. Closing of contacts 696—1 energizes the coil for the drill ejection cylinder control valve 638.

Control valve 638 is now operated against the action of its biasing spring 698 to a position wherein hydraulic fluid is admitted to the left-hand end of the ejection cylinder 464, as the latter is viewed in FIG. 21. The drill ejecting plunger 456, operated by the ejection cylinder, is now extended to the left as in FIG. 14*d* to eject the drill from the drill holder. After a short period of time, the contacts of the time delay relay 696 reopen to permit the ejection cylinder control valve 638 to be returned to its normal position by the action of its biasing spring. Drill ejection plunger 456 is thereby retracted to its normal position.

The parts of the machine are thus again in their normal positions in readiness for the next drill grinding operation.

The grinding wheel dresser 474 is started by pushing a start button 700 located on the front side of the machine in FIG. 1. Operation of this button operates a latching relay 702 which energizes the coil of the dresser control valve 640 and shifts the latter to the right in FIG. 21 to a position wherein hydraulic fluid flows from the hydraulic supply line 626, through the valve 640, past an adjustable needle valve 704 to the lower end of the dresser cylinder 576. The upper end of the dresser cylinder is then vented to the return line 642.

The dresser head 534 is thus rocked upwardly, as viewed in FIG. 20 from its lower limiting position. During this upward rocking of the dresser head, the cam follower 608 rides over the cam surface 610 and causes the dressing tool 604 to move over the edge of the grinding wheel 36 in such a way as to form the bevelled grinding surface 36*a* and the cylindrical surface 36*c* on the wheel. The needle valve 704 is set to produce a relatively slow rate of travel of the dressing tool 604 over the grinding wheel. Upon the dresser head reaching a predetermined elevated position, it operates a limit switch 706 which unlatches the relay 702. The valve 640 is then returned to its normal position by a spring 708 and the dresser head is rocked down to its normal position. This grinding cycle is repeated as often as necessary by pushing the button 700.

Briefly now recounting the operation of the machine, the operator first inserts the drill to be pointed into the drill bushing 108 of the drill holder 38 to the position wherein its tip engages the drill locating sleeve 448, so that the drill is oriented in a predetermined axial angular position in the drill head 88 for proper grinding and relieving of its tip. The operator then pushes the start button 646 to initiate the grinding operation.

Immediately upon operation of this button, the drill is gripped by the drill holder chuck 114 and the drill holder is lowered from its initial elevated position of FIG. 14*a* to its position of FIG. 14*b*. The drill holder is then reciprocated and oscillated, the drill chuck 114 is rotated, and the pivot shaft 262 for the bell crank lever 282 is slowly turned from its counterclockwise limiting position to its clockwise limiting position, all in synchronism and in such manner that the tip of the drill is fed against and past the grinding wheel 36 in a series of grinding passes, in the manner to be presently discussed and schematically illustrated in FIG. 14*c*.

After a period of time, advancing of the drill toward the grinding wheel is discontinued while the latter continues to be moved in a series of grinding passes past the wheel until "spark out" occurs. The parts of the machine are then returned to their normal positions, and the pointed drill is ejected from the drill holder (FIG. 14*d*) to condition the machine for the next drill pointing operation.

The present drill pointing machine is designed to point and relieve the tip of a drill in somewhat the same fashion as described in Patent No. 1,546,453. For this reason, the actual movements of the drill past the grinding wheel to achieve the particular grind desired will not be discussed in too great detail. The drill movements will, however, be briefly discussed by reference to FIGS. 12 through 15.

Generally speaking, the drill holder elevating and oscillating cams 238 and 240 are so configured and relatively angularly oriented as to produce the oscillatory motion of the drill head 88, relative to the grinding wheel 36, illustrated in FIGS. 14, 14*b*, 14*c* and 15. In the initial position of the drill head (FIG. 14*b*), the tip of the drill is spaced from the grinding wheel 36. The first part of the oscillatory motion of the drill head involves rotation of the latter, on the axis of the drill holder post 90, from the initial position of FIG. 14*b* to the position of FIG. 14, wherein one lip of the drill contacts the inclined or bevelled grinding surface 36*a* on the grinding wheel. The exact path followed by the drill head during its movement between the position of FIG. 14*b* and the position of FIG. 14, that is, whether or not the drill head is moved along the axis of the post 90, as well as rotated on this axis, of course, is unimportant so long as the drill D is moved to its initial grinding position of FIG. 14. The next part of the oscillatory drill head motion involves continued rotation of the drill head toward the grinding wheel and upward axial movement of the drill head toward the circular grinding edge 36*b*. This simultaneous rotation and axial movement of the drill head results in a compound axial motion of the drill toward the grinding wheel and lateral translational motion of the drill toward the circular grinding edge 36*b*, as indicated in FIG. 15 which illustrates the relative positions occupied by the drill and grinding wheel at the end of each grinding pass.

The final part of each oscillation of the drill head involves rotation and downward axial movement of the drill head from its position of FIG. 15 back to its initial position of FIG. 14. Here again, the exact path followed by the drill head during this last part of the oscillation is unimportant.

It will be recalled that at the outset of the grinding operation, the drill is oriented in a predetermined angular position in the drill holder and is thereafter rotated in predetermined synchronism or timed relationship with respect to oscillatory motion of the drill head 88 just described. This initial angular position of the drill and the timing between the rotation of the drill and oscillatory motion of the drill head are such that during each pass of the drill past the grinding wheel, one lip of the drill is initially engaged with the bevelled grinding surface 36*a* which grinds a conical face at a predetermined angle on that lip, and subsequently rotated across and against the circular grinding edge 36*b* in such a way that the conical lip face is gouged out or relieved by the circular grinding edge 36*b* in the manner illustrated at R in FIGS. 12 and 13 and discussed in the aforementioned Patent No. 1,546,453. The rotation of the drill is also so synchronized with the oscillatory motion of the drill head that on each successive pass of the drill head past the grinding wheel, a successive lip of the drill will be in the proper initial grinding position when the drill head reaches the initial grinding position of FIG. 14. The rate of rotation of the drill and the angle through which it turns during the interval between each disengagement of the drill from the grinding wheel at the termination of one pass and reengagement of the drill with the grinding wheel at the commencement of the next pass, obviously, will depend on the number of lips on the drill.

It will be recalled that during this oscillatory motion of the drill head, the pivot shaft 262 for the bell crank lever 282 is slowly rotated from its counterclockwise limiting position to its clockwise limiting position to effect gradual feeding of the drill toward the grinding wheel. This feed of the drill is terminated just prior to the end of the grinding operation, grinding of the drill then being continued without such feed until "spark out" occurs.

The net result of these drill head motions is to grind on the drill a tip of the character illustrated in FIGS. 12 and 13 wherein the angle $\alpha$ denotes the point angle produced by the bevelled grinding surface 36*a* and R denotes the concave reliefs formed in the inclined lip faces of the drill by the circular grinding edge 36*b*. As preliminarily mentioned, the purpose of the reliefs R, the concave bottom walls of which merge generally tangentially in the axial direction of the drill, is to produce a more pronounced point P on the drill tip which aids in maintaining the drill on center during the drilling operation so as to improve the accuracy and precision of the drill. Optimum accuracy and precision, of course, are obtained when the point P is accurately centered on the drill axis A.

One of the primary advantages and features of the present drill pointing machine resides in the use of the fixed drill bushing 108 for rotatably supporting the drill being pointed immediately behind its tip while the latter is being ground, as may be clearly observed in FIGS. 14 and 15. Because of the fact that the tip of the drill is supported in the fixed drill bushing in this way, the drill is accurately rotated on its own axis A during the grinding operation with the result that the tip point P will be produced exactly on this axis as is necessary to optimum accuracy and precision of the drill. As preliminarily mentioned, such accurate rotation of the drill on its own axis is not obtained where, as in many prior art drill pointing machines, the drill is rotated on the axis of a rotary chuck which may not, and in most cases is not, accurately coincident with the drill axis. Also, by supporting the drill close to its tip, as shown, the drill is supported against lateral deflection during the grinding operation.

It will be apparent, therefore, that there has been described and illustrated a drill pointing machine which is fully capable of attaining the several objects and advantages preliminarily set forth.

While a present preferred form of the invention has been described and illustrated, it will be obvious that numerous modifications in design, arrangement of parts and instrumentalities of the invention are possible within the spirit and scope of the following claims.

We claim:

1. In a drill pointer, the combination of a frame, a rotary grinding wheel on said frame having a coaxial grinding surface terminating in a coaxial grinding edge, a holder on the frame for a drill to be pointed, means for moving a drill positioned in the holder with respect to the grinding wheel to initially engage the drill tip against said grinding surface with the drill axis inclined at a predetermined angle to the surface and thereafter move the drill tip past the grinding wheel with a compound movement involving approximately axial movement of the drill tip toward the grinding surface and simultaneous lateral movement of the drill tip toward and finally across said grinding edge, means for rotating the drill in the drill holder during and in synchronism with said compound movement, and said holder including a fixed bushing which moves laterally with the drill for rotatably supporting the latter immediately adjacent its tip during movement of the latter past the grinding wheel.

2. In a drill pointer, the combination of a frame, a rotary grinding wheel on the frame having a coaxial grinding surface terminating in a coaxial grinding edge, a drill holder on the frame including a fixed bushing to rotatably support a drill to be pointed immediately adjacent its tip, means for effecting relative movement between said drill holder and grinding wheel to move said bushing and wheel toward and past one another in such a way that the relative movement of the bushing with respect to the grinding wheel is a compound relative movement involving relative approximately axial movement of the bushing toward said grinding surface with the bushing axis inclined at a predetermined angle relative to the surface and simultaneous relative lateral movement of the bushing toward said grinding edge, and means for axially positioning a drill in the holder and rotating the drill in synchronism with said relative movement between the bushing and grinding wheel.

3. The subject matter of claim 2 wherein said grinding wheel is stationary and said first-mentioned means comprises means for moving said holder with respect to the grinding wheel in such a way that said bushing is moved approximately axially toward said grinding surface and laterally toward said grinding edge.

4. In a drill pointer, the combination of a frame, a rotary grinding wheel on the frame having a coaxial grinding surface terminating in a coaxial grinding edge, a drill holder on the frame including a fixed bushing to rotatably support a drill to be pointed immediately adjacent its tip, means for effecting relative cyclic movement between said drill holder and grinding wheel to periodically move the holder and wheel toward and past one another in such a way that the relative movement of said bushing with respect to the wheel is a compound relative movement involving relative approximately axial movement of the bushing toward said grinding surface and simultaneous relative lateral movement of the bushing toward said grinding edge, and means for axially positioning a drill in the bushing and rotating the drill during and in synchronism with said relative movement between the bushing and grinding wheel.

5. In a drill pointer, the combination of a frame, a rotary grinding wheel on said frame having a coaxial grinding surface terminating a coaxial grinding edge, a bushing to rotatably support a drill to be pointed immediately adjacent its tip, and a drill holder supporting said bushing on the frame for approximately axial motion of the bushing toward and way from the grinding wheel in a transverse direction of said grinding surface and simultaneous lateral motion of the bushing in a transverse direction of said grinding edge.

6. In a drill pointer, the combination of a frame, a drill holder supported on the frame for oscillation on and reciprocation along a given axis, means on said holder for positioning a drill to be pointed with its axis offset from and in a plane approximately perpendicular to said given axis, and means for synchronously oscillating and reciprocating the holder on said given axis and rotating the drill in the holder.

7. In a drill pointer, the combination of a frame, a rotary grinding wheel on the frame having a peripheral bevelled grinding surface which intersects a side face of the wheel to form a circular grinding edge, a drill holder supported on the frame for oscillation on and reciprocation along a given axis parallel to the axis of the grinding wheel, said holder including means for positioning a drill to be pointed with its axis offset from and disposed in a plane approximately perpendicular to said given axis, and means for simultaneously and synchronously oscillating and reciprocating said holder and rotating a drill in the holder to periodically move the rotating drill past the grinding wheel in contact with the latter in such a way that on each pass of the drill past the wheel the drill tip is initially engaged with said grinding surface and the drill is thereafter moved axially toward said surface and simultaneously laterally toward and across said edge to grind a bevelled face on the tip and a relief in this face.

8. In a drill pointer, the combination of a frame, a rotary grinding wheel on the frame having a coaxial grinding surface terminating in a coaxial grinding edge, a holder on the frame for a drill to be pointed, means for effecting relative cyclic movement between a drill in the holder and the grinding wheel to periodically bring the drill tip and said grinding surface into initial contact with the drill axis inclined at a predetermined angle to the surface and thereafter cause relative movement of the drill tip and wheel past one another in such a way that the relative movement of the drill with respect to the wheel is a compound relative movement involving approximately relative axial movement of the drill toward said surface and relative lateral movement of the drill toward said edge, means for rotating the drill during and in synchronism with said cyclic movement, feed means for relatively advancing the drill and grinding wheel a slightly greater distance toward one another in the axial direction of the drill during each relative pass of the drill past the grinding wheel, means for automatically deactivating said feed means to terminate said relative advancing of the drill and grinding wheel toward one another while said cyclic movement continues to allow spark out to occur, and means to automatically terminate said cyclic movement a predetermined interval of time after deactivation of said feed means.

9. In a drill pointer, the combination of a frame, a rotary grinding wheel on the frame having a coaxial grinding surface terminating in a coaxial grinding edge, a holder on the frame for a drill to be pointed, means for effecting cyclic movement of the holder toward and away from the grinding wheel in such a way that the tip of drill is periodically moved into contact with said grinding surface with the drill axis inclined at a predetermined angle to the surface and the drill is thereafter moved axially toward the surface and laterally toward said edge, means to rotate the drill in the holder in synchronism with said cyclic movement of the holder, feed means to progressively advance the holder a slightly greater distance toward the grinding wheel in the aixal direction of the drill during each successive pass of the holder past the wheel, means to automatically deactivate said feed means after predetermined progressive advancing of the holder toward the wheel while said cyclic movement of the holder continues to allow for spark out to occur, and means for terminating said cyclic movement of the holder a predetermined interval of time after deactivation of said feed means.

10. In a drill pointer, the combination of a frame, a drill holder mounted for oscillation on and reciprocation along a given axis of the frame and including means for positioning a drill to be pointed with its axis offset from and in a plane perpendicular to said given axis, means for synchronously oscillating and reciprocating said holder and rotating the drill in the holder, and feed means for progressively increasing the swing of the holder in one direction of oscillation.

11. In a drill pointer, the combination of a frame, a rotary grinding wheel on said frame, a drill holder mounted on the frame for movement in opposite directions along a given axis parallel to the axis of the grinding wheel and oscillation in a transverse direction of the wheel toward and away from the wheel approximately in the plane of the latter to move the tip of a drill in the holder along a closed path into and out of contact with said wheel, said holder being movable along said axis away from the plane of the wheel to a loading and unloading position wherein the holder is located a distance beyond one side face of the wheel to permit loading of a drill into and removal of the drill from the holder, and power operated means for automatically moving the holder from said position, synchronously rotating a drill in the holder and reciprocating the holder along said axis and oscillating the holder toward and away from said wheel to move the tip of the drill holder along said path a number of times, and returning the holder to said position.

12. In a drill pointer, the combination of a frame, a drill holder including a post mounted for oscillation on and reciprocation along a given axis, means on the frame for oscillating and reciprocating the drill holder, said holder also including a head structure at one end of the post, a fixed drill bushing in said head structure for rotatably supporting a drill to be pointed immediately adjacent its tip, the axis of said bushing being laterally offset from and located in a plane perpendicular to said given axis, and means for rotating the drill in the bushing including a rotary chuck on said head structure at the rear of said bushing for gripping the shank of the drill.

13. In a drill pointer, a drill holder comprising a head structure including a fixed bushing to rotatably support a drill to be pointed immediately behind its tip, a rotary chuck on the head structure behind the bushing for gripping the drill shank, a cylindrical post mounting and extending from said head structure, the axis of said post being laterally offset from said bushing axis and perpendicular to a plane passing through the latter axis, and means including a drive shaft extending axially through the post for rotating the chuck to rotate the drill in the bushing.

14. In a drill pointer, the combination of a frame, a drill holder including a post mounted on the frame for oscillation on a given axis, a radial projection on the post, a lever pivoted on the frame and engaging the projection to swing the holder upon pivoting of the lever, means for pivoting the lever, and means for gradually shifting the pivot of said lever to change the angle through which the holder is swung by the lever.

15. In a drill pointer, the combination of a frame, a drill holder including a post mounted on the frame for oscillation on and movement along a given axis, first means on the frame connected to said post for reciprocating the latter, said first means including a rotatable connection with the post whereby the latter may freely turn on its axis with respect to the first means, second means on the frame connected to the post for oscillating the latter, said second means including an axially slidably connection with the post whereby the latter may freely move axially with respect to the second means, and power means on the frame for synchronously operating said first and second means to simultaneously oscillate and reciprocate said holder.

16. The subject matter of claim 15 including a rotary chuck in the holder for gripping and rotating a drill in the holder, and means for rotating said chuck including telescopic drive shaft means extending axially through the post and operatively connecting said chuck and power means.

17. In a drill pointer, the combination of a frame, a drill holder including a post mounted on the frame for oscillation on and reciprocation along a given axis, a first lever pivoted on the frame, means connecting said lever and post for movement of the latter along said axis by pivoting of the lever and rotation of the post relative to the lever, a second lever pivoted on the frame, means connecting said second lever and post for swinging of the post by pivoting of the second lever and axial movement of the post relative to the second lever, and means for pivoting said levers in synchronism to simultaneously oscillate and reciprocate said holder.

18. In a drill pointer, the combination of a frame, a rotary grinding wheel on the frame having a coaxial grinding surface terminating in a coaxial grinding edge, a drill holder on the frame movable away from the grinding wheel to a normal position wherein a drill may be placed in and removed from the holder, means for moving said holder between said normal position and a second position proximate to the grinding wheel, start means for operating said first-mentioned means to move the holder from said normal position to said second position, power operated means activated by movement of said holder to said second position for synchronously rotating a drill in the holder and moving the holder toward and away from the grinding wheel to periodically move the drill therein past the grinding wheel in such a way that on each pass of the drill past the wheel its tip is initially engaged with said grinding surface with the drill axis inclined at a predetermined angle to the surface and the drill is thereafter moved axially toward the surface and simultaneously laterally toward said grinding edge, feed means for gradually axially advancing the drill a slightly greater distance toward the grinding wheel on each successive pass until a predetermined total advance has been effected, and stop means for deactivating said second means a sufficient period of time after said predetermined advance has been effected to allow spark out to occur and actuating said first-mentioned means to return said holder to its normal position.

19. The subject matter of claim 18 wherein said power operated means includes a rotary power driven chuck in said holder for releasably gripping the shank of a drill in the holder, and means for clamping said chuck in response to operation of said start means and releasing said chuck in response to operation of said stop means.

20. The subject matter of claim 18 wherein said drill holder includes a fixed bushing for rotatably supporting a drill in the holder immediately adjacent to the grinding wheel during movement of the drill past the wheel, and said power operated means includes a rotary chuck behind the bushing for gripping the shank of the drill to rotate the latter in the bushing.

21. The subject matter of claim 18 wherein said grinding wheel turns on a vertical axis, said power operated means comprises means for oscillating the holder on and reciprocating the holder along a given axis parallel to the grinding wheel axis, said holder includes means to position a drill with its axis laterally offset from and in a plane perpendicular to said given axis for movement of the drill toward and away from the grinding wheel in a plane parallel to the wheel by oscillation of the holder, said grinding surface comprises a bevelled grinding surface which intersects the upper side face of the wheel to form said grinding edge, and said normal position of the holder is located above the grinding wheel and said second position is located approximately in the plane of the wheel.

22. The subject matter of claim 18 including drill locating and ejection means on the frame adjacent said normal position of the holder for angularly and axially locating a drill in the holder at the start of a drill pointing operation, and means actuated by return of the holder to said normal position at the end of a drill pointing operation to operate the drill ejection means to eject a drill from the holder.

23. In a drill pointer, the combination of a frame, a rotary grinding wheel on the frame having a bevelled peripheral grinding edge which intersects a side face of the wheel to form a circular grinding edge, a drill holder on the frame, means for effecting relative movement between the holder and grinding wheel in such a way that the relative movement of a drill in the holder with respect to the wheel is radially and axially of said wheel and across said surface and edge, a wheel dressing tool, first means for relatively moving said dressing tool and grinding wheel in such a way as to effect selective relative feeding of the wheel and tool toward one another in the radial direction of the wheel and past one another in the axial direction of the wheel to dress said grinding surface and edge, second means for relatively advancing the grinding wheel and drill holder toward one another, and means for synchronously operating said first and second means in such a way as to move the drill holder and grinding wheel toward one another by an amount equal to the relative radial movement of the dressing tool and grinding wheel toward one another.

24. In a drill pointer, the combination of a frame, a grinding wheel on the frame having a bevelled peripheral grinding surface which intersects a side face of the wheel to form a circular grinding edge, means including a drill holder on the frame for synchronously rotating a drill in the holder and moving the drill tip across said grinding surface and edge to point and relieve the tip, means for dressing the wheel including a dresser head mounted on the frame for movement axially of the wheel, a dressing tool carried on the head for movement across the edge of the wheel axially of the latter during movement of the dresser head, and means including a cam on the frame and a cam follower connected to the tool for moving the latter radially of the wheel during its movement across the edge of the wheel in such a way as to dress said bevelled grinding surface.

25. In a drill pointer, the combination of a frame, a rotary grinding wheel on said frame having a beveled, peripheral grinding surface terminating at one side face of the wheel in a coaxial grinding edge, a holder on the frame for a drill having a tip to be pointed, means for effecting relative movement between the drill and the grinding wheel to bring the drill tip and said beveled grinding surface into contact with the drill axis approximately parallel to the plane of the grinding wheel and thereafter cause relative movement of the drill and grinding wheel past one another in such a way that the relative movement of the drill tip with respect to the wheel is a compound movement involving relative approximately axial movement of the drill tip toward the beveled grinding surface and simultaneous relative lateral movement of the drill tip in the axial direction of the grinding wheel toward said grinding edge, and means for rotating the drill during and in synchronism with said relative movement of the drill and grinding wheel.

26. In a drill pointer, the combination of a frame, a drill holder on the frame including a fixed bushing to rotatably support a drill to be pointed adjacent its tip, first means on the holder to rotate the drill in the bushing while restraining the drill against axial movement in the bushing, second means on the frame for moving said holder to move said bushing approximately in the direction of the axis of the bushing, third means on the frame separate from said second means for moving said holder to move said bushing in a transverse direction of said bushing axis, and means for operating said first, second, and third means in synchronism.

27. The subject matter of claim 26 wherein said second means comprises a cam and said third means comprises a separate cam.

28. In a drill pointer, the combination of a frame, a drill holder mounted for oscillation on and reciprocation along a given axis and including means for positioning a drill to be pointed with its axis offset from and in a plane transverse to said given axis, first means for rotating the drill in the holder, second means for reciprocating said holder, third means separate from said second means for oscillating the holder, and means for operating said first, second, and third means in synchronism.

29. The subject matter of claim 28 wherein said second means comprises a cam and said third means comprises a separate cam.

30. In a drill pointer, the combination of a frame, a rotary grinding wheel on said frame, a drill holder mounted on the frame for movement in opposite directions along a given axis parallel to the axis of the grinding wheel and oscillation in a transverse direction of the wheel axis toward and away from the wheel approximately in the plane of the latter to move the tip of a drill in the holder along a closed path into and out of contact with said wheel, said holder being movable along said axis away from the plane of the wheel to a loading and unloading position wherein the holder is located a distance beyond one side face of the wheel to permit loading of a drill into and removal of the drill from the holder, power operated means for automatically moving the holder from said position, synchronously rotating a drill in the holder, reciprocating the holder along said axis and oscillating the holder toward and away from said wheel to move the tip of a drill in the holder along said path a number of times, and returning the holder to said position, a drill locator fixedly and immovably mounted on the frame opposite said one side face of the grinding wheel and adjacent said position of the holder against which the tip of the drill is engageable to locate the latter in a predetermined axial and angular position in the holder, and the holder including means to releasably clamp the drill in said predetermined position.

31. In a drill pointer, the combination of a frame, a rotary grinding wheel on the frame having a contoured, peripherel grinding surface, a drill holder on the frame for positioning a drill with its axis approximately parallel to the plane of the grinding wheel, first means for moving said holder in the axial direction of the drill toward and away from said grinding surface, second means for moving the holder in a direction normal to the axis of the drill and parallel to the axis of the grinding wheel, means for operating said first and second means in synchronism to feed the tip of the drill against and over said grinding surface, and means for rotating the drill in synchronism with said movement of the drill.

References Cited in the file of this patent

UNITED STATES PATENTS

| | | |
|---|---|---|
| 743,033 | Ridderhof | Nov. 3, 1903 |
| 777,247 | Dahl | Dec. 13, 1904 |
| 1,379,853 | Cogsdill | May 31, 1921 |
| 1,448,746 | Hunt et al. | Mar. 20, 1923 |
| 1,817,405 | Braren | Aug. 4, 1931 |
| 2,384,899 | Dixon | Sept. 18, 1945 |
| 2,538,651 | Parker | Jan. 16, 1951 |
| 2,637,950 | Norsworthy et al. | May 12, 1953 |
| 2,796,703 | Bushey et al. | June 25, 1957 |
| 2,815,610 | Siemsen et al. | Dec. 10, 1957 |
| 2,848,847 | Casselman | Aug. 26, 1958 |
| 2,870,579 | Siemsen et al. | Jan. 27, 1959 |

FOREIGN PATENTS

| | | |
|---|---|---|
| 23,609 | Great Britain | Nov. 4, 1908 |
| 26,452 | Great Britain | Nov. 25, 1911 |